United States Patent
Patil et al.

(10) Patent No.: US 9,801,127 B2
(45) Date of Patent: Oct. 24, 2017

(54) SYSTEM AND METHOD TO PROVIDE POWER MANAGEMENT FOR A MULTIMODE ACCESS POINT IN A NETWORK ENVIRONMENT

(71) Applicant: CISCO TECHNOLOGY, INC., San Jose, CA (US)

(72) Inventors: Santosh Ramrao Patil, San Jose, CA (US); Swaminathan A. Anantha, Mountain View, CA (US); Srinivasa Reddy Irigi, San Jose, CA (US); Hema Shankar Bontha, Newark, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/051,387

(22) Filed: Feb. 23, 2016

(65) Prior Publication Data

US 2017/0245211 A1   Aug. 24, 2017

(51) Int. Cl.
| H04W 52/02 | (2009.01) |
| H04W 8/00 | (2009.01) |
| H04W 84/12 | (2009.01) |
| H04W 84/04 | (2009.01) |
| H04W 88/10 | (2009.01) |

(52) U.S. Cl.
CPC ....... H04W 52/0206 (2013.01); H04W 8/005 (2013.01); *H04W 84/042* (2013.01); *H04W 84/12* (2013.01); *H04W 88/10* (2013.01)

(58) Field of Classification Search
None
See application file for complete search history.

(56) References Cited

U.S. PATENT DOCUMENTS

| 7,379,739 B2 | 5/2008 | Rajkotia et al. |
| 7,983,667 B2 | 7/2011 | Hart et al. |
| 8,107,950 B2 | 1/2012 | Amirijoo et al. |
| 8,320,965 B2 | 11/2012 | Kwun |
| 8,340,703 B2 | 12/2012 | Laroia et al. |

(Continued)

FOREIGN PATENT DOCUMENTS

| CN | 102378288 | 3/2012 |
| CN | 104684052 A | 6/2015 |

(Continued)

OTHER PUBLICATIONS

U.S. Appl. No. 14/679,868, filed Apr. 6, 2015, entitled "System and Method for Managing Interference in a Network Environment Based on User Presence," Inventors: Mark Grayson, et al.
U.S. Appl. No. 14/687,198, filed Apr. 15, 2015, entitled "System and Method for Managing Interference in a Network Environment Based on User Presence," Inventors: Mark Grayson, et al.

(Continued)

*Primary Examiner* — Diane Mizrahi
(74) *Attorney, Agent, or Firm* — Patterson + Sheridan, LLP

(57) ABSTRACT

An example method is provided in one example embodiment and may include determining whether at least one user equipment (UE) is present within a combined WiFi coverage area that overlaps a small cell coverage area of a multimode access point (AP), wherein the multimode AP comprises a WiFi AP portion and a small cell AP portion; and controlling a power saving mode for the small cell AP portion of the multimode AP based on whether at least one UE is determined to be present within the combined WiFi coverage area that overlaps the small cell coverage area of the multimode AP.

20 Claims, 11 Drawing Sheets

(56) References Cited

U.S. PATENT DOCUMENTS

| | | |
|---|---|---|
| 8,340,711 B1 | 12/2012 | Glass et al. |
| 8,437,810 B2 | 5/2013 | Hussain |
| 8,588,698 B2 | 11/2013 | Brisebois |
| 8,611,299 B2 | 12/2013 | Yang et al. |
| 8,639,243 B2 | 1/2014 | Radulescu et al. |
| 8,712,459 B2 | 4/2014 | Lim et al. |
| 8,792,886 B2 | 7/2014 | Meshkati et al. |
| 8,811,905 B1 | 8/2014 | Hui |
| 8,830,936 B2 | 9/2014 | Ren |
| 9,414,310 B2 | 8/2016 | Grayson |
| 9,450,695 B2 | 9/2016 | Zhu |
| 9,609,618 B2 | 3/2017 | Okmyanskiy et al. |
| 2004/0203746 A1 | 10/2004 | Knauerhase |
| 2005/0153692 A1 | 7/2005 | Hwang |
| 2006/0034236 A1 | 2/2006 | Jeong |
| 2006/0229087 A1 | 10/2006 | Davis et al. |
| 2007/0008885 A1 | 1/2007 | Bonner |
| 2008/0039089 A1 | 2/2008 | Berkman |
| 2009/0280854 A1 | 11/2009 | Khan |
| 2010/0002614 A1 | 1/2010 | Subrahmanya |
| 2010/0056184 A1 | 3/2010 | Vakil |
| 2010/0112982 A1 | 5/2010 | Singh et al. |
| 2010/0240314 A1 | 9/2010 | Chang |
| 2010/0260036 A1 | 10/2010 | Molnar et al. |
| 2010/0260068 A1 | 10/2010 | Bhatt et al. |
| 2010/0279628 A1 | 11/2010 | Love et al. |
| 2011/0110316 A1 | 5/2011 | Chen et al. |
| 2011/0122841 A1 | 5/2011 | Aoyagi |
| 2011/0211514 A1 | 9/2011 | Hamalainen |
| 2012/0004003 A1 | 1/2012 | Shaheen et al. |
| 2012/0015657 A1 | 1/2012 | Comsa et al. |
| 2012/0100849 A1 | 4/2012 | Marsico |
| 2012/0100851 A1 | 4/2012 | Zheng |
| 2012/0129537 A1 | 5/2012 | Liu et al. |
| 2012/0258720 A1 | 10/2012 | Tinnakornsrisuphap et al. |
| 2012/0265888 A1 | 10/2012 | Roeland et al. |
| 2013/0003697 A1 | 1/2013 | Adjakple et al. |
| 2013/0077482 A1 | 3/2013 | Krishna et al. |
| 2013/0102313 A1 | 4/2013 | Tinnakornsrisuphap et al. |
| 2013/0136072 A1 | 5/2013 | Bachmann et al. |
| 2013/0163543 A1 | 6/2013 | Freda et al. |
| 2013/0182680 A1 | 7/2013 | Choi et al. |
| 2013/0210431 A1 | 8/2013 | Abe |
| 2013/0229945 A1 | 9/2013 | Cha et al. |
| 2013/0294356 A1 | 11/2013 | Bala et al. |
| 2013/0308531 A1 | 11/2013 | So et al. |
| 2013/0326001 A1 | 12/2013 | Jorgensen et al. |
| 2013/0337821 A1 | 12/2013 | Clegg |
| 2013/0339783 A1 | 12/2013 | Alonso et al. |
| 2013/0343304 A1 | 12/2013 | Kaippallimalil et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0078986 A1 | 3/2014 | Kaippallimalil et al. |
| 2014/0086226 A1 | 3/2014 | Zhao et al. |
| 2014/0112251 A1 | 4/2014 | Kim et al. |
| 2014/0146732 A1 | 5/2014 | Olufunmilola et al. |
| 2014/0155109 A1 | 6/2014 | Vaidya et al. |
| 2014/0241316 A1 | 8/2014 | Okmyanskiy et al. |
| 2015/0016419 A1 | 1/2015 | Kim |
| 2015/0045048 A1 | 2/2015 | Xu |
| 2015/0119063 A1 | 4/2015 | Yu et al. |
| 2015/0133130 A1 | 5/2015 | Gupta |
| 2015/0148036 A1 | 5/2015 | Grayson et al. |
| 2015/0341821 A1* | 11/2015 | Hong .................... H04W 28/08 370/230 |
| 2015/0365894 A1 | 12/2015 | Bai |
| 2016/0037560 A1* | 2/2016 | Liu .................... H04L 51/34 370/329 |
| 2016/0183174 A1* | 6/2016 | Xie .................... H04W 48/18 455/436 |
| 2016/0192433 A1 | 6/2016 | Deenoo |
| 2016/0255531 A1* | 9/2016 | Stein .................... G06F 1/1632 |
| 2016/0295357 A1 | 10/2016 | Grayson |
| 2016/0295521 A1 | 10/2016 | Grayson |

FOREIGN PATENT DOCUMENTS

| | | |
|---|---|---|
| EP | 2466972 | 6/2012 |
| EP | 2757850 | 7/2014 |
| EP | 2879444 | 6/2015 |
| EP | 2981119 | 2/2016 |
| WO | WO2011/085238 | 7/2011 |
| WO | WO2011/134529 | 11/2011 |
| WO | WO2011/137345 | 11/2011 |
| WO | WO2012/055984 | 5/2012 |
| WO | WO2013/041574 | 3/2013 |
| WO | WO2013/082245 | 6/2013 |
| WO | WO2013/086659 | 6/2013 |
| WO | WO2013/169991 | 11/2013 |

OTHER PUBLICATIONS

"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex-France, Jul. 2014; Section 4, pp. 17-88.

"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex-France, Jun. 2014; See Sections 1-5, pp. 11-76.

"Broadband Forum TR-196 Femto Access Point Service Data Model," Broadband Forum Technical Report, Issue 2, Issue Date: Nov. 2011, © The Broadband Forum. All Rights Reserved; 46 pages.

"Broadband Forum Technical Report: TR-069 CPE WAN Management Protocol," Issue: 1, Amendment 4, Issue Date: Jul. 2011 Protocol Version 1.3; © The Broadband Forum; 190 pages.

"Broadband Forum Technical Report: TR-196 Femto Access Point Service Data Model," Issue: 1, Issue Date: Apr. 2009, © The Broadband Forum; 131 pages.

"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex-France, Jun. 2010; See Section 4, pp. 15-46.

"ETSI TS 123 402 V9.8.0 (Mar. 2011) Technical Specification: Universal Mobile Telecommunications System (UMTS); LTE; Architecture enhancements for non-3GPP accesses (3GPP TS 23.402 version 9.8.0 Release 9)," ETSI, 650 Route des Lucioles, F-06921, Sophia Antipolis Cedex-France, Mar. 2011; See Section 4-6, pp. 14-116.

"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex-France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8-8.3.9 pp. 289-292; §8.5.21 pp. 357-365; §10.2.7 pp. 620-623; Annex B.3 pp. 2045-2052].

"ETSI TS-125-469 V11.2.0 (Apr. 2013) Technical Specification: Universal Mobile Telecommunications System (UMTS); UTRAN Iuh interface Home Node B (HNB) Application Part (HNBAP) signaling (3GPP TS 25.469 version 11.2.0 Release 11)," © European Telecommunications Standards Institute 2013; Apr. 2013; 78 pages.

"ETSI TS-125-469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," © European Telecommunications Standards Institute 2010; Oct. 2010; 64 pages.

(56) References Cited

OTHER PUBLICATIONS

3GPP TSG-RAN WG3 #61bis, R3-081174, "Solution for interference reduction SON use case," Orange, Alcatel-Lucent, Agenda Item 10.1.1c; Kansas City, MO, USA; 6 pages.
3GPP TSG-RAN WG3 Meeting #73bis R3-112481, "Issues Related to Cell RACH Support for HNB Handover," Alcatel-Lucent, 3GPP Draft, Zhuhai, China, Oct. 10-14, 2011; 10 pages.
3GPP TSG-RAN3 Meeting #69 R3-102094, "Text Proposal for HNBRAP," Alcatel-Lucent, 3GPP Draft, Madrid, Spain, Aug. 23-27, 2010; 62 pages.
3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.
3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.
Adrangi, F., et al., "Chargeable User Identity," Network Working Group RFC 4372, Jan. 2006, 10 pages.
Almeida, Erika, et al., "Enabling LTE/Wifi Coexistence by LTE Blank Subframe Allocation," 2013 IEEE International Conference on Communications (ICC), Jun. 9, 2013, pp. 5083-5088.
Ashraf, Imran, "Distributed Radio Coverage Optimization in Enterprise Femtocell Networks," International Conference on Communications ICC 2010, May 23-27, 2010, Cape Town, South Africa; 6 pages.
"Legacy UE Macro to HNB Active Hand-in," 3GPP TSG RAN WG3 Document No. R3-112600, Oct. 14, 2011, pp. 1-4.
"Submission to 3GPP TSG-RAN WG2 Meeting 66 bis," Document No. 62-093921; Jul. 3, 2009, pp. 1-2.
Calhoun, P., "Diameter Base Protocol," Network Working Group RFC 3488, Sep. 2003; 147 pages.
Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.
Droms, R., "Dynamic Host Configuration Protocol," Network Working Group RFC 2131, Mar. 1997; 45 pages.
ETSI TS123 401 V12.70 (Jan. 2015) Technical Specification: "LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.
ETSI TS125 367 V9.4.0, "Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.
Guttman, E., et al., "Service Location Protocol, Version 2," Network Working Group RFC 2608, Jun. 1999, 57 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Holbrook, H., et al., "Source-Specific-Multicast for IP," Network Working Group RFC 4607, Aug. 2006.
Leung, K., et al., "WiMAX Forum/3GPP2 Proxy Mobile IPv4," Independent Submission RFC 5563, Feb. 2010; 41 pages.
Narten, T., et al., "Neighbor Discovery for IP version 6 (IPv6)," Network Working Group RFC 4861, Sep. 2007; 97 pages.
Ratasuk, Rapeepat, et al., "License-exempt LTE Deployment in Heterogeneous Network," 2012 International Symposium on Wireless Communications Systems (ISWCS), Aug. 28, 2012, pp. 246-250.
Saad, Sawsan A., et al., "A Survey on Power Control Techniques in Femtocell Networks," Journal of Communications vol. 8, No. 12, Dec. 2013; 10 pages.
Tayal, "All About PDCCH and CCE Allocation—PDCCH (Physical downlink Control Channel)," Tayal's Way to Learn LTE, May 2013; 14 pages http://nitintayal-lte-tutorials.blogspot.com/2013/03/all-about-pdcch-and-cce-allocation.html.
"3GPP TS 23.401 V13.5.0 (Dec. 2015) Technical Specification: $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles, F-06921, Sophia Antipolis Cedex-France, Dec. 2015; 337 pages.
"802.11 Association Process Explained," Cisco Meraki, Article ID 2110; First published on or about Sep. 19, 2015; 3 pages https://documentation.meraki.com/MR/WiFi_Basics_and_Best_Practices/802.11_Association_process_explained.
"LTE Quick Reference: CCE Index Calculation," LTE Handbook, Share Technote, First published on or about Jul. 8, 2012 http://www.sharetechnote.com/html/Handbook_LTE_CCE±Index.html.
"LTE Quick Reference: Resource Allocation and Management Unit," LTE Handbook, Share Technote, First published on or about Jul. 13, 2012 http://www.sharetechnote.com/html/Handbook_LTE_ResourceAllocation_ManagementUnit.html.
"3GPP TS 22.368 V13.0.0 (2014-06) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.
"3GPP TS 23.060 V13.0.0 (2014-09) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.
"3GPP TS 23.682 V12.2.0 (2014-06) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.
"3GPP TS 23.887 V12.0.0 (2013-12) Technical Report: 3rd Generation Partnership Project; Technical Specification Group Services and System Aspects; Study on Machine-Type Communications (MTC) and other mobile data application communications enhancements (Release 12)," 3rd Generation Partnership Project; Dec. 2013.
"3GPP TS 23-203 V13.1.0 (2014-09) Technical Specification: 3rd Generation Partnership Project; Technical Specification Group Services and System Aspects; Policy and charging control architecture (Release 13)," [Relevant Sections 106 only]; 3rd Generation Partnership Project, Sep. 2014.
"3GPP TS 29-272 V12-6-0 (2014-09) Technical Specification: 3rd Generation Partnership Project; Technical Specification Group Core Network and Terminals; Evolved Packet System (EPS); Mobility Management Entity (MME) and Serving Gprs Support Node (SGSN) related interfaces based on Diameter protocol (Release12)," [Relevant Sections 5 and 7.3.1-7.3.21 only]; 3rd Generation Partnership Project; Sep. 2014.
"3GPP TS 29-274 V12-6-0 (2014-09) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.
"3GPP TS 36.300 V12.3.0 (2014-09) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.
"3GPP TS 36.413 V12.3.0 (2014-09) Technical Specification: 3rd Generation Partnership Project; Technical Specification Group Radio Access Network; Evolved Universal Terrestrial Radio Access

(56) References Cited

OTHER PUBLICATIONS

Network (E-UTRAN); S1 Application Protocol (S1AP) (Release 12)," [Relevant Sections 9.1.6 and 9.2.3.13 only]; 3rd Generation Partnership Project, Sep. 2014.
"ETSI TS 123 007 V12.6.0 (2014-10) Technical Specification: Digital Cellular Telecommunications System (Phase 2±); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex-France, Oct. 2014; 93 pages.
"ETSI TS 123 401 V11.10.0 (2014-07) Technical Specification: Lte; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex-France, Jul. 2014.
"ETSI TS 123 401 V12.6.0 (2014-09) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex-France, Sep. 2014; 308 pages.
"ETSI TS 125 211 V11.5.0 (2014-07) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex-France, Jul. 2014.
"ETSI TS 129 061 V12.7.0 (2014-10) Technical Specification: Digital cellular telecommunications system (Phase 2±); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex-France, Oct. 2014; 170 pages.
"ETSI TS 129 212 V12.6.0 (2014-10) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex-France, Oct. 2014, 232 pages.
"ETSI TS 129 213 V12.5.0 (2014-10) Technical Specification: Digital Cellular Telecommunications System (Phase 2±); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex-France, Oct. 2014.
"ETSI TS 129 214 V12.5.0 (2014-10) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex-France, Oct. 2014; 64 pages.
"ETSI TS 136 133 V12.5.0 (2014-11) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex-France, Nov. 2014
"ETSI TS 136 331 V12.3.0 (2014-09) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.5 only]; ETSI, 650 Route des Lucioles, F06921, Sophia Antipolis Cedex-France, Sep. 2014.
"GSMA LTE Roaming Guidelines, Version 9.0," GSM Association, Official Document IR88, Jan. 24, 2013; 53 pages.
"Paging Channel Selection," UMTS World; first published on or about Jun. 22, 2003; 3 pages http://www.umtsworld.com/technology/paying.html.
"Paging Indicator Channel PICH Work in 3G" Teletopix.org, Telecom Techniques Guide, Feb. 13, 2014, 2 pages http://www.teletopix.org/3g-wcdma/paging-indicator-channel-pich-work-in-3g/.
"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.
"PDCCH Processing," published by Gio Zakradze on Dec. 29, 2014; 56 pages.
"3GPP TR 23.852 (V12.0.0) (2013-09) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.
"3GPP TR23.705 V0.11.0 (2014-05) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex-France, May 2014, 64 pages.
"Cisco ASR 5000 Series Small Cell Gateway," Cisco White Paper, C11-711704-00, Jul. 2012, Cisco Systems, Inc., Printed in USA, ©2012 Cisco and/or its affiliates. All Rights Reserved. 6 pages.
"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.
"Extensible Authentication Protocol," Wikipedia, the free encyclopedia, Sep. 16, 2013, 10 pages; http://en.wikipedia.org/wiki/Extensible_Authentication_Protocol#EAP-FAST.
"Link Layer Discovery Protocol," Wikipedia, the free encyclopedia, Sep. 25, 2013, 4 pages, http://en.wikipedia.org/wiki/Link_Layer_Discovery_Protocol.
"Radius," Wikipedia, the free encyclopedia, Sep. 26, 2013, 12 pages. http://en.wikipedia.org/wiki/Radius.
3GPP TS 32.522 v11.2.0, "3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.
ETSI TS125 469 v11.2.0, "Universal Mobile Telecommunications System (UMTS); UTRAN Iuh interface Home Node B (HNB); Application Part (HNBAP) signalling (3GPP TS25.469 version 11.2.0 Release 11)," European Telecommunications Standards Institute, 650 Route des Lucioles, F-06921 Sophia Antipolis Cedex, France, Apr. 2013, 78 pages.
Horn, Gavin, "3GPP Femtocells: Architecture and Protocols," Qualcomm Incorporated, 5775 Morehouse Drive, San Diego, CA, Sep. 2010; 64 pages.
Nivaggioli, Patrice, "Cisco Small Cell Architecture," Cisco Connect, Dubrovnik, Croatia, South East Europe, May 20-22, 2013, ©2012 Cisco and/or its affiliates. All Rights Reserved.; 40 pages.
Boccardi, Federico, et al., "Power Savings in Small Cell Deployments via Sleep Mode Techniques," Jan. 2010, 6 pages http://www.researchgate.net/publication/251976899.
Cai, Shijie, et al., "Power-Saving Heterogeneous Networks through Optimal Small-Cell Scheduling," GlobalSIP 2014: Energy Efficiency and Energy Harvesting Related Signal Processing and Communications, Dec. 3-5, 2014; 5 pages.
"Cisco Aironet 3700 Series Access Points," Data Sheet, Cisco Systems, Inc., C78-729421-04, Sep. 2014; 10 pages.
"Cisco Mobility IQ," Cisco Systems, C45-733657-00, Feb. 2015; 2 pages.
"Electric power," from Wikipedia, the free encyclopedia, Jan. 15, 2016; 6 pages.
"Energy vs. Power, Difference and Comparison," Diffen.com, First published on or about Jul. 26, 2011; 3 pages.
"ETSI TS 125 467 V12.3.0 (2015-01) Technical Specification: Universal Mobile Telecommunications System (UMTS); UTRAN

(56) References Cited

OTHER PUBLICATIONS architecture for 3G Home Node B (HNB); Stage 2 (3GPP TS 25.467 version 12.3.0 Release 12)," European Telecommunications Standards Institute, 650 Route des Lucioles, F-06921 Sophia Antipolis Cedex, France, Jan. 2015; 93 pages.
"ETSI TS 132 593 V12.0.0 (2014-10) Technical Specification: LTE; Telecommunication management; Home enhanced Node B (HeNB) Operations, Administration, Maintenance and Provisioning (OAM &P); Procedure flows for Type 1 interface HeNB to HeNB Management System (HeMS) (3GPP TS 32.593 version 12.0.0 Release 12)," European Telecommunications Standards Institute, 650 Route des Lucioles, F-06921 Sophia Antipolis Cedex, France, Oct. 2014; 21 pages.
"IEEE Std 802.11—2012 (Revision of IEEE Std 802.11-2007: Part 11: Wireless LAN Medium Access Control (MAC) and Physical Layer (PHY) Specifications IEEE Standard for Information technology—Telecommunications and information exchange between systems; Local and metropolitan area networks, Specific Requirements," IEEE Standards Association, IEEE Computer Society, Mar. 29, 2012; Relevant sections: 3, 4.10, and 8.3.3.6 only.
Lewis, Rob, "The Great 'Power vs. Energy' Confusion," CleanTechnica, Feb. 2, 2015; 17 pages; http://cleantechnica.com/2015/02/02/power-vs-energy-explanation.

\* cited by examiner

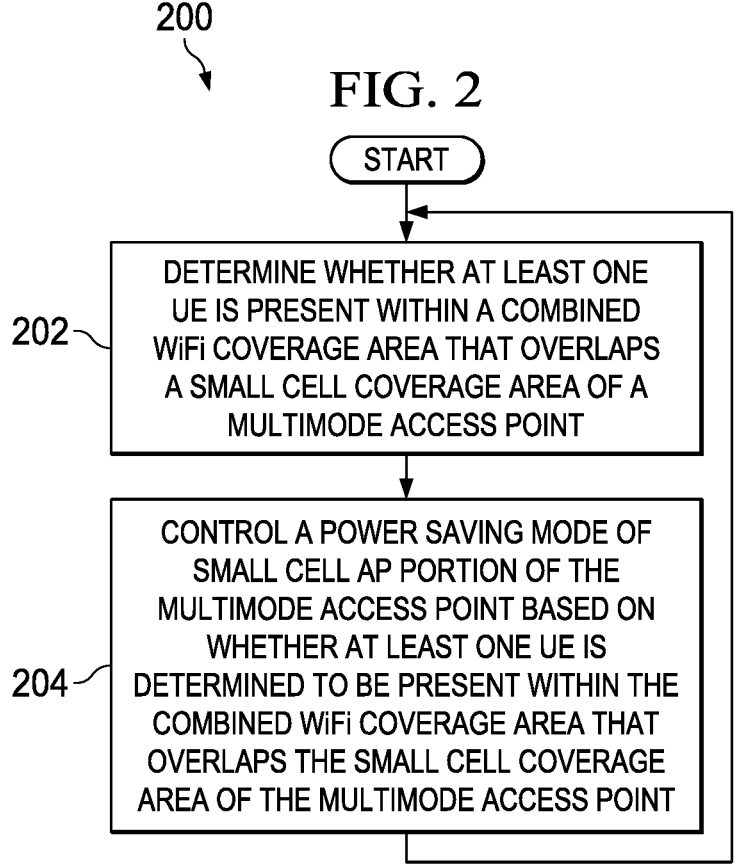

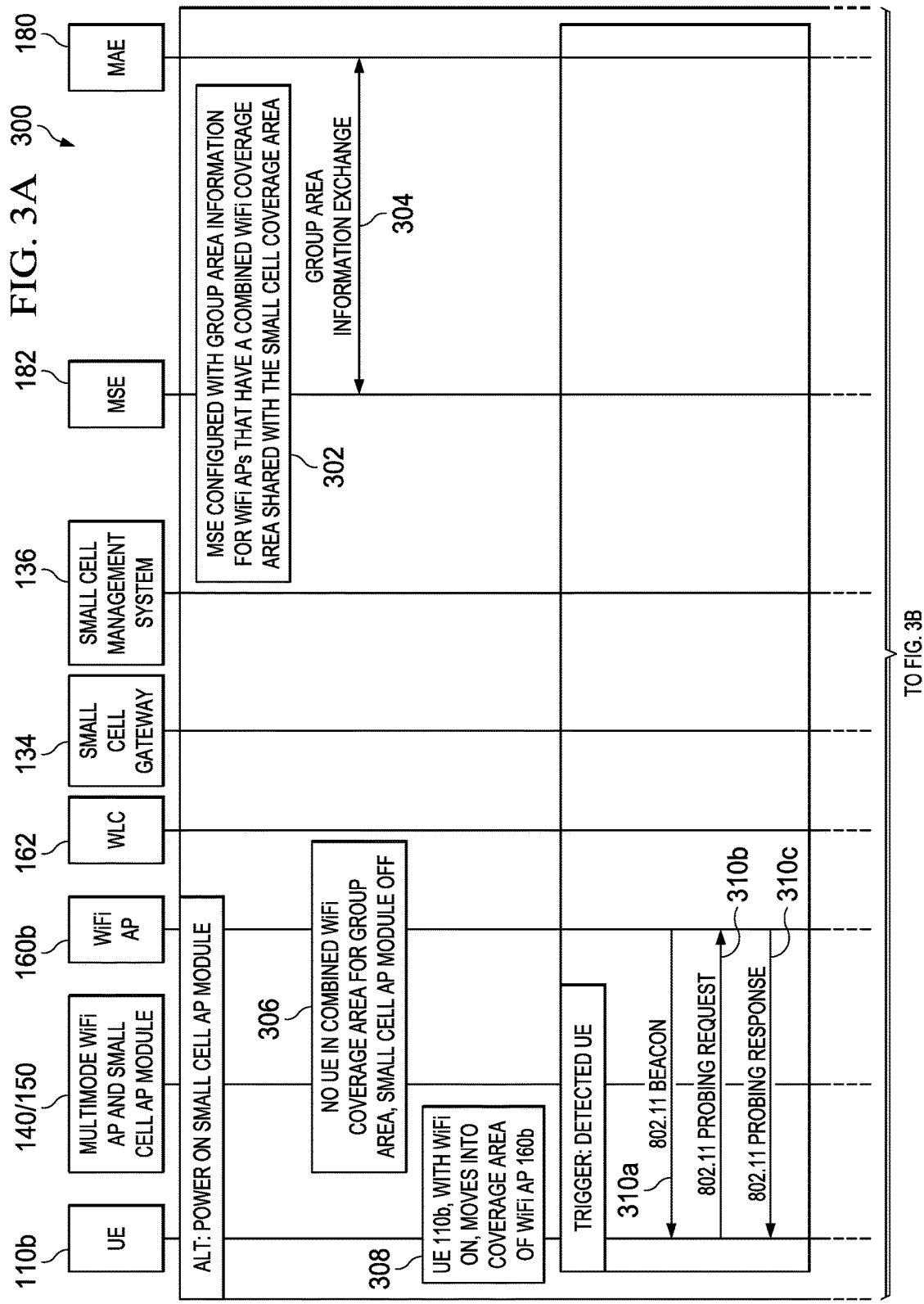

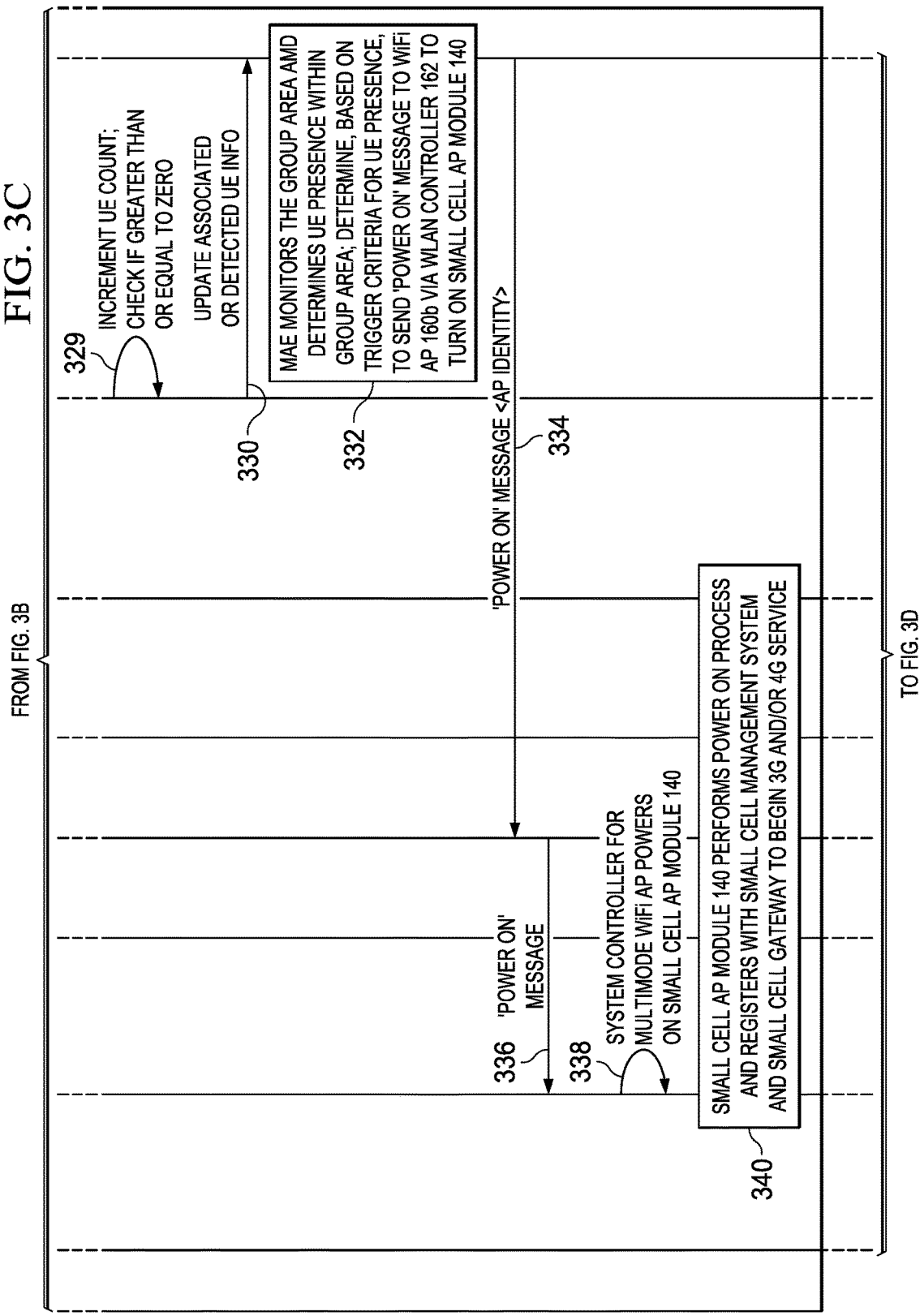

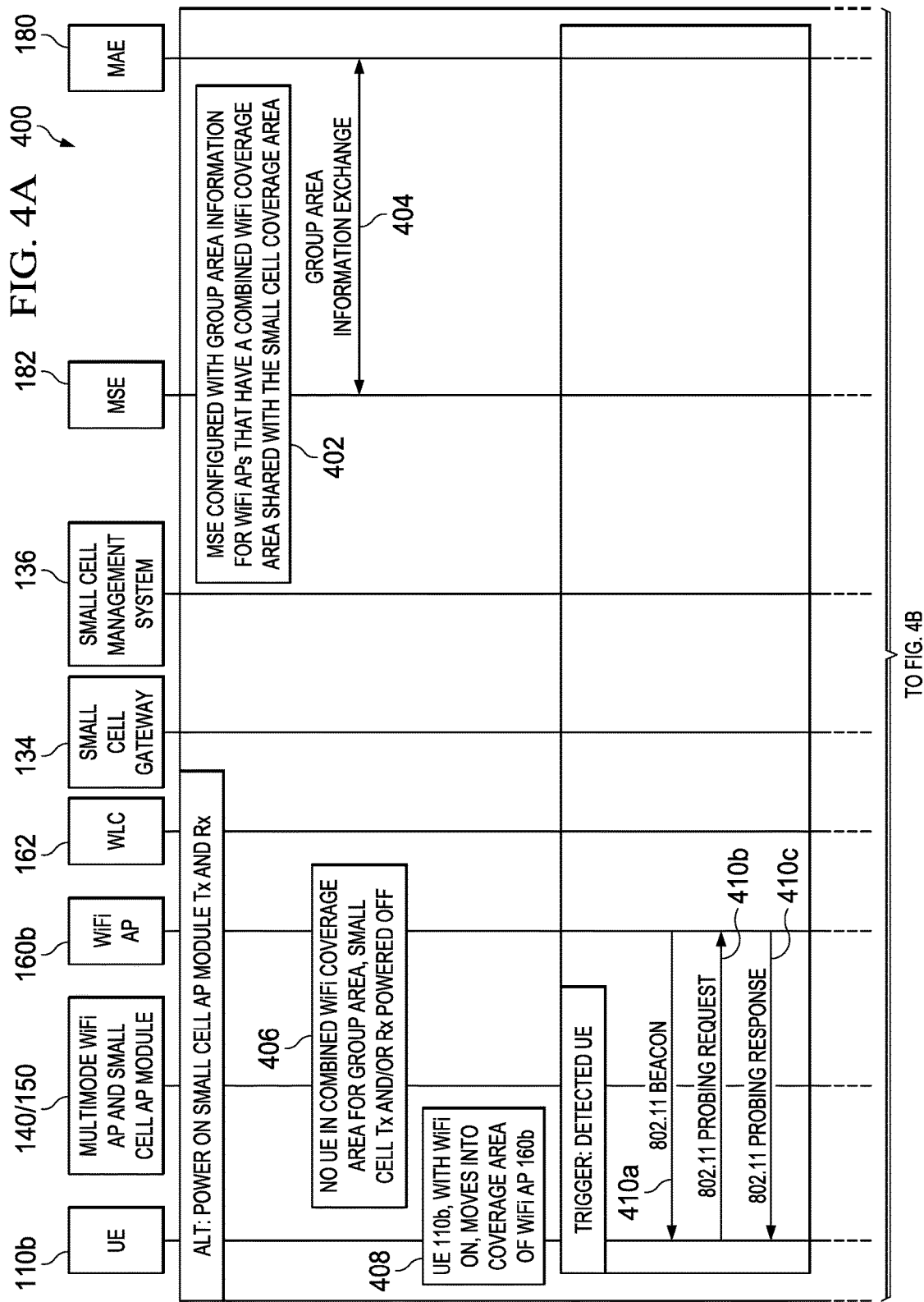

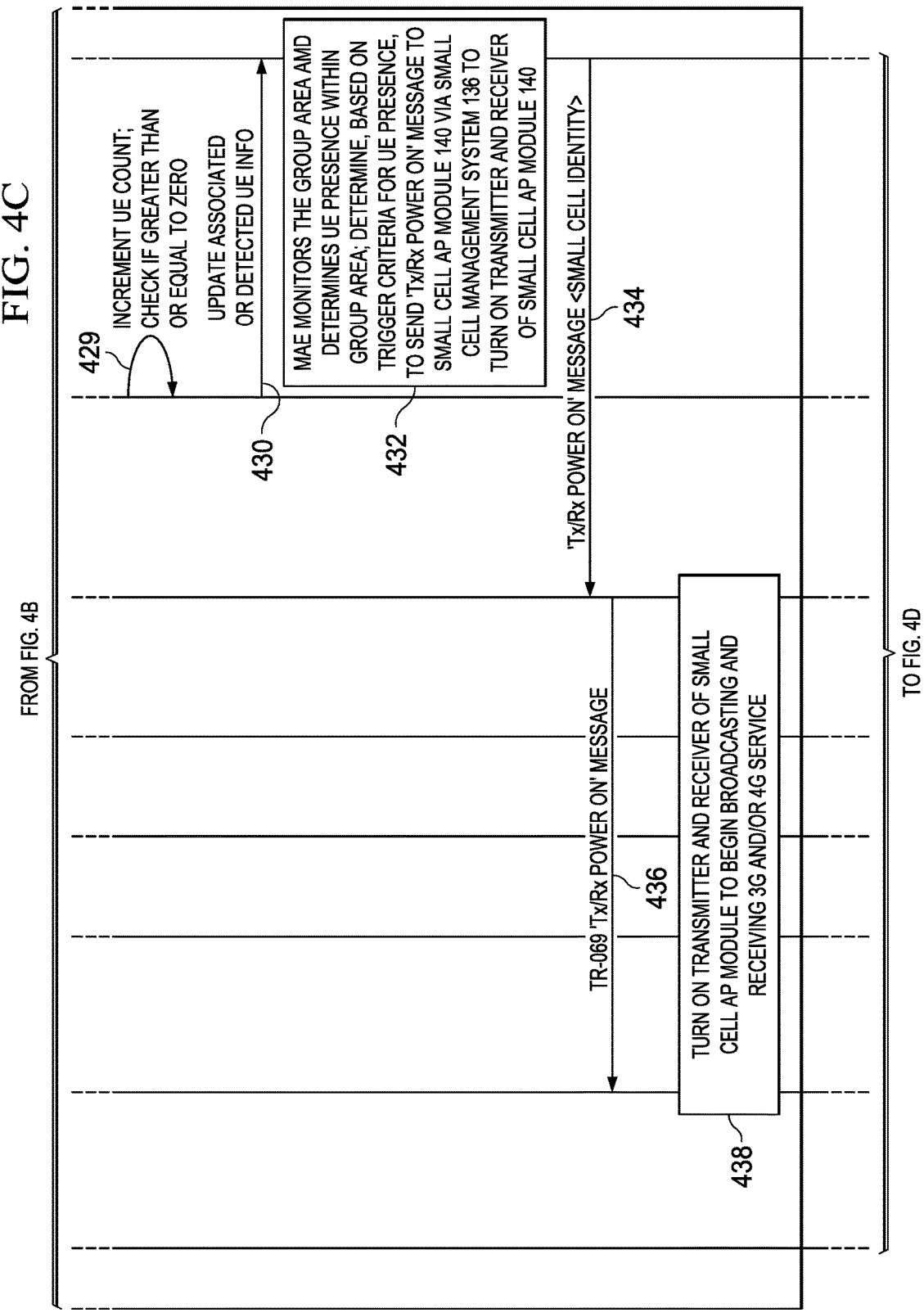

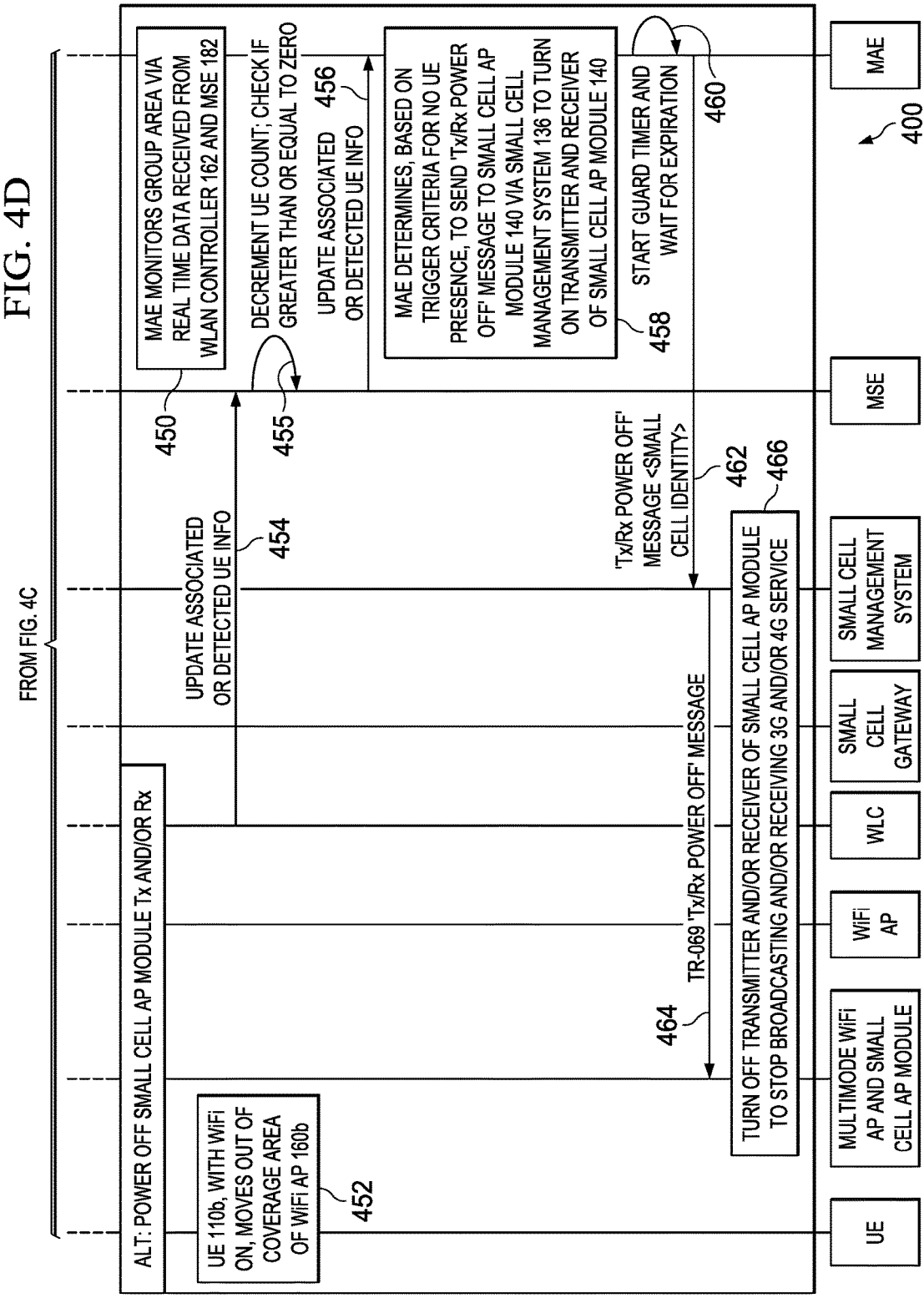

SYSTEM AND METHOD TO PROVIDE POWER MANAGEMENT FOR A MULTIMODE ACCESS POINT IN A NETWORK ENVIRONMENT

TECHNICAL FIELD

This disclosure relates in general to the field of communications and, more particularly, to a system and method to provide power management for a multimode access point (AP) in a network environment.

BACKGROUND

Networking architectures have grown increasingly complex in communication environments. For example, small cells have gained notoriety due to their capabilities to connect wireless devices to a network. In general terms, small cell access points can operate in a licensed spectrum to connect user equipment to the network, often using broadband connections. For a mobile operator, small cell access points can offer improvements to both coverage and capacity, which is particularly applicable to indoor networking environments where macro cell networks typically suffer coverage limitations. Small cell access points can also offer an alternative networking architecture to deliver the benefits of scalable small cell deployments. However, small cell access points consume power even if there are no users connected to the small cell access points. As the number of small cell access points that are deployed in a network increases, increased power consumption of the small cell access points becomes a concern of network operators. Accordingly, there are significant challenges in managing power for networks that include small cell access points.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified flow diagram illustrating example operations that can be associated with providing power management for a multimode WiFi AP in a network environment in accordance with one potential embodiment of the communication system;

FIGS. 3A-3D is a simplified interaction diagram illustrating example details that can be associated with providing power management for a multimode WiFi AP in accordance with various potential embodiments of the communication system; and FIGS. 4A-4D is a simplified interaction diagram illustrating other example details that can be associated with providing power management for a multimode WiFi AP in accordance with various potential embodiments of the communication system.

DETAILED DESCRIPTION OF EXAMPLE EMBODIMENTS

Overview

A method is provided in one example embodiment and may include determining whether at least one user equipment (UE) is present within a combined WiFi coverage area that overlaps a small cell coverage area of a multimode access point (AP), wherein the multimode AP comprises a WiFi AP portion and a small cell AP portion; and controlling a power saving mode for the small cell AP portion of the multimode AP based on whether at least one UE is determined to be present within the combined WiFi coverage area that overlaps the small cell coverage area of the multimode AP. In some cases, the method can further include configuring a mapping associating the small cell coverage area to the combined WiFi coverage area, wherein the combined WiFi coverage area comprises a plurality of WiFi coverage areas for a plurality of WiFi APs that overlap the small cell coverage area, wherein a WiFi coverage area of the WiFi AP portion of the multimode AP is included in the mapping.

In one instance, the power saving mode can be associated with enabling or disabling power for the small cell AP portion of the multimode AP. In such an instance, the controlling can include one of: disabling power for the small cell AP portion of the multimode AP via a Wireless Local Area Network (LAN) Controller (WLAN) if at least one UE is not determined to be present within the combined WiFi coverage area; and enabling power for the small cell AP portion of the multimode AP via a Wireless Local Area Network (LAN) Controller (WLAN) if at least one UE is determined to be present within the combined WiFi coverage area.

In another instance, the power saving mode can be associated with enabling or disabling power for at least one of a transmitter and a receiver of the small cell AP portion of the multimode AP. In such an instance, the controlling can further include one of: disabling power for the at least one of the transmitter and the receiver of the small cell AP portion of the multimode AP via a small cell management system if at least one UE is not determined to be present within the combined WiFi coverage area; and enabling power for the at least one of the transmitter and the receiver of the small cell AP portion of the multimode AP via a small cell management system if at least one UE is determined to be present within the combined WiFi coverage area.

In some cases, a particular UE can be determined to be present within the combined WiFi coverage area based on the particular UE completing an 802.11 association procedure with at least one of the: WiFi AP portion of the multimode AP and a one of a plurality of WiFi APs within the combined WiFi coverage area. In another instance, a particular UE can be determined to be present within the combined WiFi coverage area based on the particular UE completing an 802.11 probing procedure with at least one of the: WiFi AP portion of the multimode AP and a one of a plurality of WiFi APs within the combined WiFi coverage area.

Example Embodiments

Figure 1A:
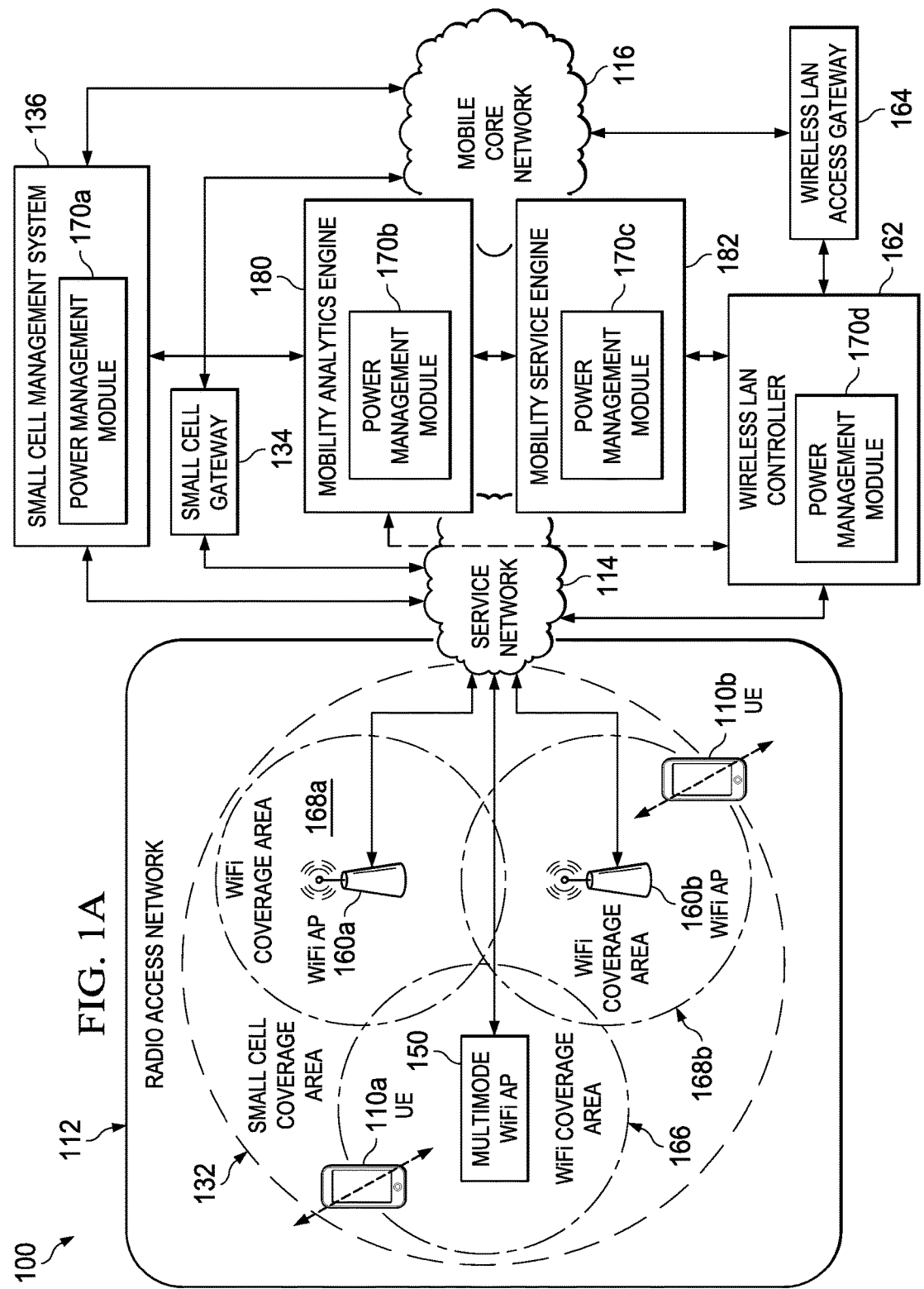
FIG. 1A is a simplified block diagram illustrating a communication system to facilitate power management for a multimode WiFi access point (AP) in a network environment according to one embodiment of the present disclosure.

Turning to FIG. 1A, FIG. 1A is a simplified block diagram illustrating a communication system 100 to facilitate providing power management for a multimode WiFi AP in a network environment according to one embodiment of the present disclosure. This particular configuration may be tied to the 3rd Generation Partnership Project (3GPP) architecture for an Evolved Packet System (EPS) architecture, also sometimes referred to as the Long Term Evolution (LTE)

Figure 1B:
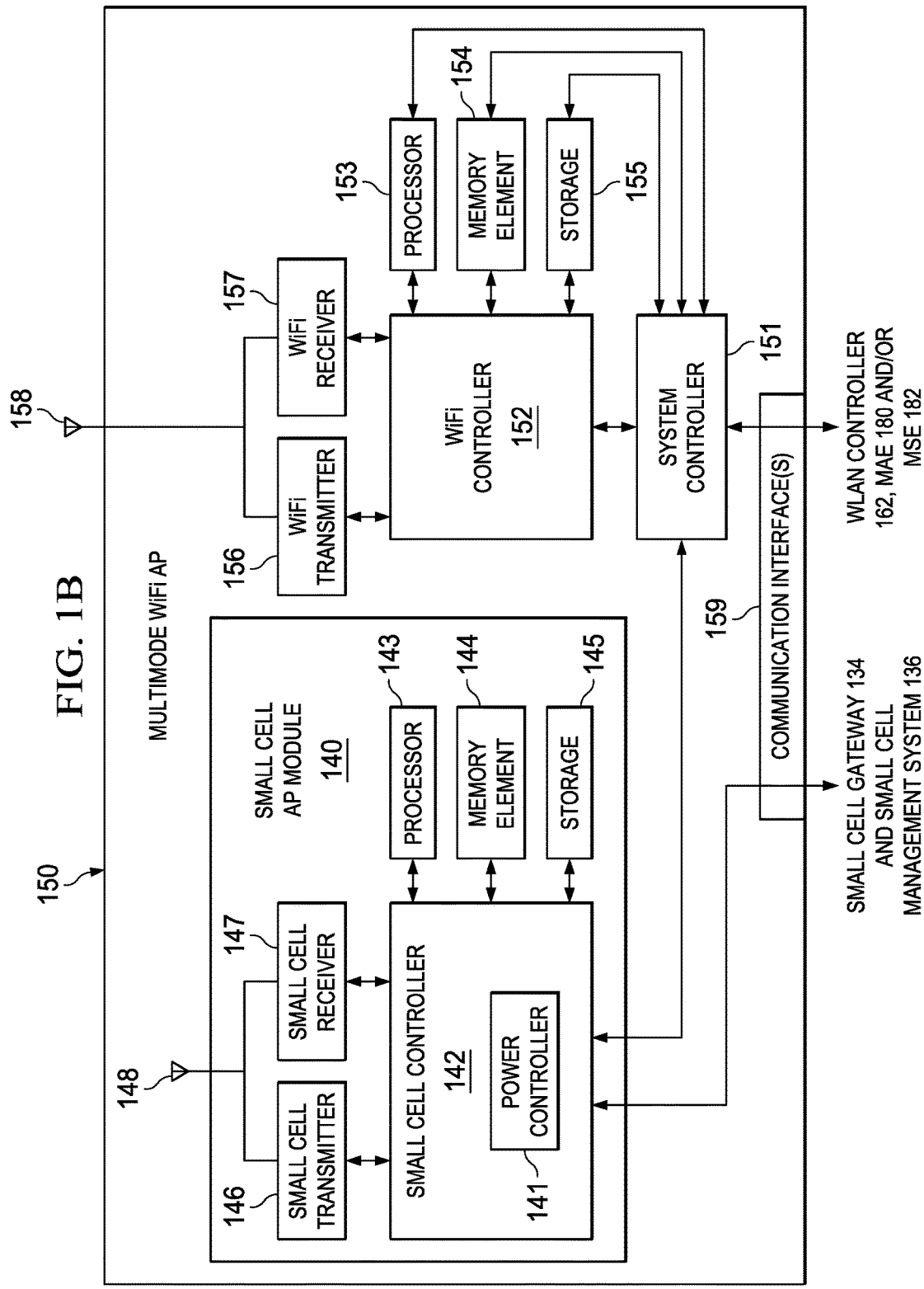
FIG. 1B is a simplified block diagram illustrating example details that can be associated with the multimode WiFi AP of FIG. 1A in accordance with one potential embodiment.

EPS architecture. Alternatively, the depicted architecture may be applicable to other environments equally. FIG. 1B is described with reference to the multimode WiFi AP shown in FIG. 1A.

The example architecture of FIG. 1A may include users operating user equipment (UE) 110a-110b within a radio access network (RAN) 112, a service network 114, a mobile core network 116, a Mobility Analytics Engine (MAE) 180 and a Mobility Service Engine (MSE) 182 within communication system 100. RAN 112 can include a multimode WiFi access point (AP) 150 and one or more single mode WiFi Access Points (APs) 160a-160b. Multimode WiFi AP 150 can be configured with a small cell AP module, discussed below with regard to FIG. 1B, which may have a logical connection to a small cell gateway 134 and a small cell management system 136 via service network 114. Multimode WiFi AP 150 can have a logical connection to a wireless local area network (LAN) controller 162 via service network 114. Wireless LAN (WLAN) controller 162 may have a logical connection to a wireless LAN (WLAN) access gateway (AGW) 164, which may have a logical connection to mobile core network 116. Each WiFi AP 160a-160b can also have a logical connection to WLAN controller 162. In at least one embodiment, MAE 180 can also have a logical connection to WLAN controller 162.

Small cell management system 136 may have a logical connection to MAE 180, WLAN controller 162 may have a logical connection to MSE 182 and MAE 180 can have a logical connection to MSE 182. Small cell management system 136 can include a power management module 170a, MAE 180 can include a power management module 170b, MSE 182 can include a power management module 170c and WLAN controller 162 can include a power management module 170d.

In general, RAN 112 may provide a communications interface between UE 110a-110b, service network 114, mobile core network 116 and/or the Internet (not shown) for one or more 3GPP and/or non-3GPP Internet protocol (IP) access networks. In various embodiments, 3GPP access networks can include Global System for Mobile Communications (GSM) Enhanced Data Rates for GSM (EDGE) radio access network (GERAN), a Universal Mobile Telecommunications System (UMTS) Terrestrial radio access network (UTRAN), generally referred to as 3G, and/or a LTE access network such as evolved UTRAN (E-UTRAN), generally referred to as 4G or LTE/LTE-Advanced (LTE-A). In various embodiments, non-3GPP IP access networks can include wireless local area networks (WLANs), which can be defined according to the Institute of Electrical and Electronics Engineers (IEEE) Standard 802.11 (e.g., WiFi), Worldwide Interoperability for Microwave Access (WiMAX), Bluetooth™ or the like.

As referred to herein in this Specification, the terms 'user', 'subscriber', 'UE' and 'user/UE' can be used interchangeably. It should be understood that a user, or more particularly, a subscriber, can be associated with the operation of a corresponding UE for one or more voice and/or data sessions. In various embodiments, a subscriber associated with a given UE can be identified using one or more identifiers such as, for example, an IMSI or a Temporary IMSI (T-IMSI). An IMSI for a given subscriber is typically stored on a Subscriber Identity Module (SIM) (e.g., a SIM card) within the subscriber's UE.

Referring to FIG. 1B, FIG. 1B is a simplified block diagram illustrating example details associated with multimode WiFi AP 150. As shown in FIG. 1B, multimode WiFi AP 150 can include a system controller 151, a WiFi controller 152, at least one processor 153, at least one memory element 154, a storage 155, a WiFi transmitter 156, a WiFi receiver 157, one or more antenna(s) 158 and one or more communication interface(s) 159. Small cell AP module 140 can include a small cell controller 142, at least one processor 143, at least one memory element 144, a storage 145, a small cell transmitter 146, a small cell receiver 147 and one or more antenna(s) 148. Small cell controller 142 can be configured to include a power controller 141.

In one embodiment, small cell AP module 140 can be a removable, modular device that can be plugged-in to or otherwise electrically connected to multimode WiFi AP 150 similar to a daughter card or module. Thus, multimode WiFi AP 150 can be considered a base unit to which one or more daughter cards or modules can be electrically connected. In some embodiments, multimode WiFi AP 150 can be configured to receive multiple small cell AP modules (e.g., a 2G/3G small cell AP module, a 4G small cell AP module, a 5G module etc.) and/or a multi-Radio Access Technology (RAT) type small cell AP capable of any combination of 2G, 3G, 4G and/or 5G RAT types. Accordingly, multimode WiFi AP 150 can include a small cell AP portion and a WiFi AP portion to provide multimode (e.g., multi-RAT) connectivity for one or more UE.

In at least one embodiment for multimode WiFi AP 150, at least one processor 153 is at least one hardware processor configured to execute various tasks, operations and/or functions of multimode WiFi AP 150 as described herein and at least one memory element 154 is configured to store data associated with multimode WiFi AP 150. In various embodiments, storage 155 for multimode WiFi AP 150 can be configured to store information associated with various operations as described herein including, but not limited to, storing a power saving mode configuration for small cell AP module 140; storing communication protocol and/or interfacing information; combinations thereof or any other information as discussed herein. In various embodiments, WiFi controller 152 can operate to implement various WiFi functionality including, but not limited to: facilitating 802.11 procedures including, for example, 802.11 probing and association procedures as prescribed by IEEE standards; facilitating other 802.11 connectivity operations as prescribed by IEEE standards; facilitating communications with WLAN controller 162 and WLAN access gateway 164 using any appropriate proprietary and/or non-proprietary protocol, interface and/or communication standard, combinations thereof or the like. In at least one embodiment, WiFi transmitter 156 and WiFi receiver 157 can operate in combination with one or more antenna(s) 158 and/or one or more other elements of multimode WiFi AP 150 to facilitate over the air WiFi communications with one or more UE for various operations as described herein.

In at least one embodiment, system controller 151 can operate to implement various operations as described herein including, but not limited to: controlling a power saving mode configured for small cell AP module 140 via WLAN controller 162 including power management module 170d and/or MSE 182 including power management module 170c; facilitating communications with small cell AP module 140 via small cell controller 142 and/or power controller 141 using any appropriate proprietary and/or non-proprietary protocol, interface and/or communication standard; facilitating communications with one or more of WLAN controller 162 including power management module 170d and MSE 182 including power management module 170c via communication interface(s) 159 using any appropriate proprietary and/or non-proprietary protocol, interface and/or communication standard; facilitating WiFi communications with one or more UE, combinations thereof or the like as described herein.

In various embodiments, communication interface(s) can include Ethernet, Power over Ethernet (PoE), Fibre Channel (FC), IEEE 1394, serial, parallel or any other communication interface that can facilitate network communications between multimode WiFi AP 150, small cell AP module 140 and/or any other cards or modules electrically connected to multimode WiFi AP 150 using any appropriate proprietary and/or non-proprietary protocol, interface and/or communication standard.

In at least one embodiment for small cell AP module 140, at least one processor 143 is at least one hardware processor configured to execute various tasks, operations and/or functions of small cell AP module as described herein and at least one memory element 154 is configured to store data associated with small cell AP module 140. In various embodiments, storage 145 for small cell AP module 140 can be configured to store information associated with various operations as described herein including, but not limited to, storing a power saving mode configuration for small cell AP module 140; storing communication protocol and/or interfacing information; combinations thereof or any other information as discussed herein. In at least one embodiment, small cell transmitter 146 and small cell receiver can operate in combination with one or more antenna(s) 148 and/or one or more other elements of small cell AP module 140 to facilitate over the air 3GPP communications with one or more UE for various operations as described herein.

In various embodiments, small cell controller 142 can operate to implement various small cell functionality including, but not limited to: facilitating connection and control procedures for small cell AP module 140 including, for example, Radio Resource Control (RRC) procedures, Non-Access Stratum (NAS) procedures, Radio Resource Management (RRM) procedures, registration procedures with small cell management system 136 and small cell gateway 134, etc. as prescribed by 3GPP standards; facilitating communications with small cell management system 136 and/or small cell gateway 134, combinations thereof or the like.

In at least one embodiment, power controller 141 can be configured to implement various power control functionality for small cell AP module 140 including facilitating communications with small cell controller 141 and system controller 151 of multimode WiFi AP 150 in order to enable or disable power for the small cell AP module 140 based on interactions with system controller 151 according to a first alternative power saving mode configuration that can be configured for small cell AP module 140 of multimode WiFi AP 150, as described in further detail herein. In at least one other embodiment, power controller 141 can be configured to implement various power control functionality for small cell AP module 140 including facilitating communications with small cell controller 141 and small cell management system 136 including power management module 170a in order to enable or disable power for at least one of the small cell transmitter 146 and/or the small cell receiver 147 based on interactions with small cell management system 136 and/or power management module 170a according to a second alternative power saving mode configuration that can be configured for small cell AP module 140 of multimode WiFi AP 150, as described in further detail herein.

In one embodiment, each of power management modules 170a-170d (as shown in FIG. 1A) can be associated with a power management Application Programming Interface (API) and/or logic that can facilitate the exchange of communications associated with providing power management operations as described herein. In one embodiment, each of power management modules 170a-170d can further be configured with certain communication protocols, interfaces and/or other communication standards, proprietary and/or non-proprietary, to facilitate the exchange of communications between a small cell network and a WiFi network, as described herein for communication system 100.

Example features illustrated in FIGS. 1A and 1B will be referred to collectively for the remainder of the Specification. Small cell AP module 140 of multimode WiFi AP 150 may provide a small cell coverage area 132, shown in FIG. 1A. Multimode WiFi AP 150 may provide a WiFi coverage area 166. Each WiFi AP 160a-160b may provide a respective WiFi coverage area 168a-168b. Each of the coverage areas illustrated in FIG. 1A can be varied by adjusting the transmit power of each corresponding AP. Typically, small cell coverage area of a given small cell AP covers a larger region in comparison to WiFi coverage area of a given WiFi AP. Multiple WiFi APs are often needed to provide a WiFi coverage area covered by a single small cell AP. Thus, in various embodiments, depending on deployment location and configuration by a network operator, small cell coverage area 132 can be configured to overlap with WiFi coverage area 166 and WiFi coverage areas 168a-168b. In some embodiments, WiFi coverage area 166, WiFi coverage area 168a and/or WiFi coverage area 168b can overlap with each other in whole or in part.

Small cell AP module 140 of multimode WiFi AP 150 can offer suitable connectivity to one or more UE (e.g., UE 110a-110b) via respective small cell coverage area 132 for one or more radio access networks using any appropriate protocol or technique. For 4G/LTE deployments, small cell AP module 140 can be configured as a Home evolved Node B (HeNB) and for 2G/3G deployments, small cell AP module 140 can be configured as a Home Node B (HNB). The WiFi portion (e.g., receiver, transmitter, etc.) of multimode WiFi AP 150 can offer suitable WiFi connectivity to one or more UE (e.g., UE 110a-110b) via WiFi coverage area 166. Thus, in general terms, multimode WiFi AP 150 can represent a radio access point device that can allows UEs to connect to a wired network using WiFi, Bluetooth™, WiMAX, any variation of IEEE 802.11, 2G, 3G, 4G or any other appropriate standard.

Each WiFi AP 160a, 160b can offer suitable WiFi connectivity to one or more UE (e.g., UE 110a-110b) via respective coverage areas 168a, 168b. Each of multimode WiFi AP 150, WiFi AP 160a and WiFi AP 160b may be in further communication with WLAN controller 162, which may be responsible for enforcing or applying system wide wireless LAN functions, such as security policies, intrusion prevention, RF management, power management, Quality of Service (QoS), and mobility management. MSE 182 can be configured to provide location services for the WiFi network including, but not limited to, determining location(s) of WiFi enabled devices such as, for example UE 110a-110b. In certain embodiments, MSE 182 can determine the location of one or more UE via one or more location techniques using, for example, received signal strength indicator (RSSI) information, time difference of arrival (TDOA) information, etc. collected from one or more WiFi APs receiving probing signals from the UE in order to triangulate the location of UE located in a vicinity of the one or more WiFi APs. In at least one embodiment, MSE 182 can be configured with one or more Application Programming Interfaces (APIs), which can facilitate communication with MAE 180 and WLAN controller 162 to provide location services for the WiFi network including WiFi APs 160a-160b and multimode WiFi AP 150.

WLAN controller 162 can further include power management module 170d which, in combination with power management module 170c of MSE 182 and/or power management module 170b of MAE 180 can facilitate power management for small cell AP module 140 of multimode WiFi AP 150 via system controller 151 of multimode WiFi AP 150, as described in further detail herein.

WLAN controller 162 may be in further communication with wireless LAN access gateway 164, which may provide connectivity to one or more packet data networks for UE 110a-110b via mobile core network 116. In various embodiments, wireless LAN access gateway 164 may be implemented as a 'SaMOG' access gateway. 3GPP standards, such as, for example, Release 11 (Rel-11), define interworking between a WLAN and LTE access systems (e.g., mobile core network 116) for S2a Mobility based on General Packet Radio Service (GPRS) tunneling protocol (GTP), generally referred to using the term 'SaMOG'.

Hence, the broad term 'access point' can be inclusive of a WiFi access point (WAP), a femtocell, a hotspot, a picocell, a WiFi array, a wireless bridge (e.g., between networks sharing a same Service Set Identifier (SSID) and radio channel), a wireless local area network (WLAN), an HNB, an HeNB or any other suitable access device, which may be capable of providing suitable connectivity to a given UE. In certain cases, an access point can connect to a router (via a wired or wireless network), which can relay data between the UE and other UE of the network. Note as referred to herein in this Specification a small cell AP (e.g., small cell AP module 140) may also be referred to interchangeably as an 'HNB', an 'HeNB', a 'small cell', a 'femtocell', a 'femto' or a 'picocell'.

Small cell gateway 134 may aggregate connectivity of small cell AP module 140 and any other small APs that may be present in communication system 100 to mobile core network 116. In various embodiments, small cell management system 136 may, during operation, provision small cell AP module 140 of multimode WiFi AP 150 according to one or more management protocols and/or data models during registration of the small cell AP module 140 with the small cell gateway 134. For example, small cell management system 136 can provision small cell AP module 140 according to technical report 069 (TR-069) protocol using the TR-196 version 2 data model, in certain embodiments. Typically, a small cell AP registers with a small cell gateway during initialization of the small cell AP following power-on of the small cell AP as prescribed by 3GPP TS 25.467, etc.

Note that small cell AP module 140 of multimode WiFi AP 150, small cell gateway 134 and small cell management system 136 can collectively be referred to interchangeably herein as a 'small cell layer', a 'small cell system' or a 'small cell network'. Note also that multimode WiFi AP 150, WiFi APs 160a-160b, wireless LAN controller 162, WLAN AGW 164 and MSE 182 can collectively be referred to interchangeably herein as a 'WiFi layer', a 'WiFi system' or a 'WiFi network'. As the coverage areas for each of the networks (e.g., small cell, WiFi) can overlap, neighbor and/or surround each other, these networks can be referenced in relation to each other using the terms 'parallel networks' or 'parallel layers' herein in this Specification.

Although not shown in FIG. 1A, it should be understood that a small cell system and/or a WiFi system can form an overlay layer for an existing macro cell network. As discussed in further detail herein, small cells can provide improved cellular connectivity in areas where coverage or service from a macro cell network is constrained due to interference (e.g., within a building) and/or due to subscriber density (e.g., within an apartment complex, commercial/retail complex, enterprise environment, etc. Generally, upon entering the coverage area of a small cell network, UE can be handed over from a macro cell network.

In at least one embodiment, multimode WiFi AP 150 and WiFi APs 160a-160b can be deployed in business (e.g., enterprise) and/or residential environments within predefined clusters or grids that can be optimized to provide contiguous or overlapping cellular and WiFi coverage for enterprise users (e.g., employees, visitors, etc.) and/or residential users when such users are located within the coverage area(s) of multimode WiFi AP 150 and WiFi AP 160a-160b deployed in such a cluster/grid.

In various embodiments, small cell management system 136 can also be used to configure or manage grid or cluster information for groups of small cell radio APs at power-on including, but not limited to, configuring grid/cluster identities (IDs) for different grids/clusters, configuring cell IDs for small cell AP module 140 of multimode WiFi AP 150 and any other small cell APs that may be present in communication system 100 (e.g., local or global); configuring physical layer identifiers (e.g., primary scrambling code (PSC), physical cell identity (PCI)) for small cell AP module 140 of multimode WiFi AP 150 and any other small cell APs that may be present in communication system 100; configuring location area code (LAC) information, routing area code (RAC) information, tracking area code (TAC) information, etc. for small cell AP module 140 of multimode WiFi AP 150 and any other small cell APs that may be present in communication system 100, combinations thereof or the like. Small cell management system 136 can further include power management module 170a, which, in combination with power management module 170b of MAE 180 can facilitate power management for small cell AP module 140 of multimode WiFi AP 150 via power controller 141 of small cell AP module 140 as described in further detail herein.

In various embodiments, multimode WiFi AP 150 can be configured in a Closed access mode or Hybrid access mode. For a Closed access mode deployment, users who are not included on an authorization list (e.g., whitelist, enterprise directory list, directory list, etc.) for a WiFi AP cannot be served by the WiFi AP (e.g., cannot attach to the WiFi AP). For a Hybrid access mode deployment, a WiFi can be deployed having a partially Closed access mode (e.g., reserving certain resources, bandwidth, etc. for whitelisted users) and a partially Open access mode (e.g., providing certain resources, bandwidth, etc. for non-whitelisted users). In various embodiments, a whitelist service or server (not shown) for the WiFi layer may be configured within WLAN controller 162 or WLAN controller 162 may interface with an external whitelist service or server to provide whitelist services for one or more WiFi APs deployed in communication system 100 for authenticating UEs seeking to attach to a given WiFi AP.

In at least one embodiment, small cell gateway 134 can determine whitelist entries for small cell AP module 140 of multimode WiFi AP 150 using a Remote Authentication Dial-In User Service (RADIUS) Access Request procedure. During operation, small cell AP module 140 can query a whitelist service or server for the small cell layer using an International Mobile Subscriber Identity (IMSI) of a user associated with a given UE (e.g., UE 110a-110b) to determine if the UE can attach to the small cell AP module 140 of the multimode WiFi AP 150. In at least one embodiment, a whitelist service or server can be included within a 3GPP Authentication, Authorization and Accounting (AAA) service/server or can be separate from such a service/server. In at least one embodiment, a whitelist service or server can be configured in residential environments (e.g., identifying users, residents, etc. capable of accessing one or more small cell APs in a home, apartment, etc.) or in commercial or enterprise environments (e.g., identifying users, employees, guests, etc. capable of accessing one or more small cell APs in an office, building, set of buildings, etc.). In still some embodiments, a whitelist service or server may be deployed within mobile core network 116, within service network 114 and/or distributed across mobile core network 116 and service network 114. In some embodiments, a whitelist server or service for a WiFi layer and a whitelist server or service for a small cell layer may be a same server or service.

In various embodiments, MAE 180 can be configured to provide network analytics across parallel layers of communication system 100 (e.g., small cell layer, WiFi layer, macro layer) by receiving and/or gathering data associated with each of the layers to manage a power saving mode of the small cell AP module 140 of multimode WiFi AP 150. In various embodiments, data gathered and/or received by MAE 180 can include location information for UE 110a-110b, user activity (e.g., data usage), loading information, interference information combinations thereof or any other data associated with one or more Key Performance Indicators (KPIs) for communication system 100. In various embodiments, MAE 180 can be configured with one or more APIs to facilitate receiving and/or gathering data within communication system 100 via small cell management system 136, MSE 182 and/or WLAN controller 162.

In at least one embodiment, MSE 182 can be configured by a network operator or service provider with location information for each of multimode WiFi AP 150 and WiFi APs 160a-160b. In various embodiments, the location information can include a mapping that associates the small cell coverage area 132 to a combined WiFi coverage area that overlays the small cell coverage area 132 such that WiFi coverage area 166 of multimode WiFi AP 150 and WiFi coverage areas 168a-168b of WiFi APs 160a-160b, respectively, are associated with the combined WiFi coverage area that is shared with the small cell coverage area 132. The association of small cell AP module 140 having small cell coverage area 132 shared with WiFi coverage areas 166, 168a and 168b can be used to define a group area that includes multimode WiFi AP 150, WiFi APs 160a and 160b and the small cell AP module 140 connected to multimode WiFi AP 150. UE presence within WiFi coverage areas 166, 168a and 168b for the group area can be monitored in order to manage the power saving mode of the small cell AP module 140. In various embodiments, location information can include grid and/or cluster IDs for the small cell coverage area 132 and the WiFi coverage areas 166, 168a and 168b; Global Positioning System (GPS) coordinates, latitude/longitude coordinates, landmark identifiers (e.g., for an office complex, for example, landmark identifiers can include room numbers, names, floors, wings, buildings, etc.), combinations thereof or the like.

During operation, in at least one embodiment, the group based mapping of the small cell coverage area 132 and the combined WiFi coverage area including WiFi coverage areas 166, 168a and 168b into a defined group area can be used by MAE 180 to manage the power saving mode of the small cell AP module 140 for multimode WiFi AP 150. Group area information can be exchanged between MSE 182 and MAE 180 at start-up, initialization, periodically or combinations thereof such that MAE 180 can store the group area information for the group area defined for the shared small cell and WiFi coverage areas. MAE 180 can monitor the group area for UE WiFi activity to manage the power saving mode of the small cell AP module 140 of multimode WiFi AP 150.

Before detailing additional operational aspects of FIG. 1A, it is important to understand common techniques for providing power management for small cell networks. The following foundation is offered earnestly for teaching purposes only and, therefore should not be construed in any way to limit the broad teachings of the present disclosure.

As referred to herein in this Specification the terms 'electric power' or, more generally, 'power' describe the rate at which electrical energy is transferred by an electrical circuit (e.g., Power=Volts*Current). Power is typically represented in units of Watts (W), milliwatts (mW), etc. As referred to herein in this Specification, the terms 'electrical energy' or, more generally 'energy' describe the capacity to do work, which equates to power integrated over time. Energy is typically represented in units of kilowatt-hours (kWh). Energy consumption for a device (e.g., a small cell AP) can refer to the amount of power consumed by the device over a period of time; thus, energy consumption of the device can be managed by controlling the amount of power consumed by the device at or across different periods of time.

In many network architectures, small cell APs can be deployed as autonomous units to improve reception in areas with poor coverage, within buildings where coverage is reduced by the structure itself, or to offload usage from macro cell networks, which may be overloaded. Essentially, small cell APs are fully featured base stations that can provide proximate coverage in a business (e.g., enterprise) and/or residential environment. Typically, small cell APs operate at lower Radio Frequency (RF) power levels as compared to macro cell radios. Calls can be made and received, where the signals are sent (potentially encrypted) from small cell APs via a service network (e.g., service network 114) to one of the service provider's main switching centers. Thus, a small cell AP generally operates as a mini tower for proximate users.

An increasing density of small cell deployments is raising alarms with service providers about the cumulative effects of energy consumption by small cell APs. Most residential small cells are idle during the day when users are away. However, they continue to consume energy and generate downlink (DL) RF pollution (e.g., RF interference) with their ongoing common pilot channel (CPICH) broadcasts (e.g., small cell APs have a flat power to load curve). In a similar manner, small cell APs in an enterprise environment may support more users during different periods of the day (e.g., day vs. night) and/or on different days of the week (e.g., weekends, holidays, etc.). In many urban environments, business hours are exactly the time when most activity occurs outside the residence.

This means that for long periods, small cell APs (e.g., either within business or residential environments) may have no associated UEs within their coverage area. In these situations, small cell APs are effectively energy consumption points and interference sources, both consuming energy and potentially degrading the performance of surrounding RF networks with RF pollution with no appreciable benefit since the small cell APs aren't offloading any traffic. Accordingly, it would be desirable to reduce the energy consumption of small cell APs and eliminate or reduce interference generated by small cell APs when they are not serving UE.

Within the industry, there exists a desire to automate the power control of small cell APs to limit their interference and reduce their energy consumption. Specifically with regard to multimode WiFi APs can provide WiFi connectivity as a base function and can include a small cell AP module to provide 2G, 3G and/or 4G connectivity, there exists a desire to automate the power control of a small cell AP module using a base WiFi AP to limit the interference and reduce the energy consumption of the small cell AP module.

In accordance with one embodiment, communication system 100 can provide a system and method to facilitate power management of a small cell AP module of a given multimode WiFi AP (e.g., small cell AP module 140 of multimode WiFi AP 150) based on UE WiFi activity determined via one or more WiFi APs (e.g., multimode WiFi AP 150 and/or WiFi APs 160a-160b) is within a defined group area that overlays the small cell coverage area of the small cell AP module of the multimode WiFi AP (e.g., small cell coverage area 132). In certain embodiments, operations described herein can be executed by respective hardware processors of configured for one or more elements of communication system 100.

In at least one embodiment, power management of the small cell AP module 140 can be facilitated by controlling a power saving mode configured for the small cell AP module 140 of multimode WiFi AP 150. Embodiments discussed herein can provide for at least two alternative power saving mode configurations for the small cell AP module 140. In at least one embodiment, the power saving mode for the small cell AP module 140 of multimode WiFi AP 150 can be configured according to a first alternative to enable or disable power to the small cell AP module 140 (e.g., power-on or power-on) based on one or more power management trigger(s) to reduce power consumption of the small cell AP module 140 to zero power consumption. In at least one embodiment, the power saving mode for the small cell AP module 140 of multimode WiFi AP 150 can be configured according to a second alternative to enable or disable a standby mode for small cell AP module 140 based on or more power management trigger(s). In at least one embodiment, the standby mode can be configured to enable or disable power to a receiver and/or a transmitter of the small cell AP module 140, while maintaining power for the module itself in a standby 'ON' state such that small cell AP module 140 can remain registered with small cell gateway 134.

The first alternative and the second alternative differ in terms of energy savings and delay in initializing service for the small cell AP module 140 such that UE can attach to the small cell AP module 140. The first alternative can provide a greater energy savings by enabling or disabling power to the small cell AP module 140 as compared to the second alternative. However, the initialization delay for the small cell AP module 140 under the first alternative will be greater than the initialization delay of the second alternative (e.g., minutes as opposed to seconds) because the first alternative involves disabling power to the small cell AP module 140 entirely whereas the second alternative merely disables power to the transmitter and/or the receiver of the small cell AP module 140. Energy savings realized by the second alternative, while not as great as the first alternative, may provide for a reduction in power consumption by as much as 50% or more over full operating power of the small cell AP module 140 merely by disabling power to the transmitter and/or receiver of the small cell AP module 140. The transmitter and receiver of a small cell AP module may consume significantly more power than other components of the module.

In various embodiments, power management triggers can include determining whether a UE is present within a defined group area (e.g., combined WiFi coverage area) for a given multimode WiFi AP using 802.11 probing procedures and 802.11 association procedures. As referred to herein the term 'UE presence' can be used to in conjunction with operations associated with determining whether a UE is present within a defined group area for a multimode WiFi AP. In one embodiment, any UE whose presence within a defined group area is determined through 802.11 probing procedures can be referred to herein as a 'detected UE'. In another embodiment, any UE whose presence within a defined group area is determined through 802.11 association procedures can be referred to herein as an 'associated UE'. As discussed herein, presence of either detected UE or associated UE within a defined group area can trigger various power management operations for controlling the power saving mode configured for the small cell AP module of a given multimode WiFi AP.

In general, a WiFi AP can transmit WiFi beacons within beacon frames, which can be received by UE within a vicinity (e.g., coverage area) of the WiFi AP. Reception of a WiFi beacon by a given UE causes the UE to initiate a probing exchange with the WiFi AP as prescribed by 802.11 standards. Through the probing exchange, the WiFi AP can determine whether the UE shares at least one common supported data rate with the WiFi AP. If so, additional authentication and association procedures can be carried out between the WiFi AP and the UE. If not, no further communication may be exchanged between the UE and the WiFi AP. Nonetheless, the 802.11 probing exchange with the UE indicates the presence of the UE in a vicinity of the coverage area of the WiFi AP. Thus, as discussed for embodiments described herein, determining the presence of a detected UE within a defined group area for a small cell AP module of a multimode WiFi AP can be used to trigger power management operations for the small cell AP module of the multimode WiFi AP.

As prescribed by IEEE 802.11, association procedures carried out between a UE and WiFi AP are used to establish an AP/UE mapping that enables UE invocation of system services. Association differs from authentication in that authentication generally refers to the process where an entity's identity is authenticated, typically by providing evidence that it holds a specific digital identity such as an identifier and corresponding credentials. Association of a UE typically follows a successful authentication of the UE with a WiFi AP. In various embodiments, communication system 100 can support different authentication techniques including extensible authentication protocol subscriber identity module (EAP-SIM) authentication techniques and/or EAP authentication and key agreement (EAP-AKA) authentication techniques. Thus, as discussed for embodiments described herein, determining the presence of an association UE within a defined group area for a multimode WiFi AP can be used to trigger power management operations for a small cell AP module of the multimode WiFi AP.

During operation, MAE 180 can control the power saving mode configured for small cell AP module 140 based on one or more power management triggers (e.g., UE presence) determined via the WiFi network for the group area defined for the shared small cell coverage area 132 and combined WiFi coverage areas 166, 168a and 168b. It should be understood that the power saving mode for small cell AP module 140 can be configured according the first alternative (e.g., enable/disable power to the module) or the second alternative (e.g., enable/disable standby mode) as discussed herein.

The presence of detected or associated UE within the group area defined by the coverage areas of multimode WiFi AP 150, WiFi AP 160*a* and WiFi AP 160*b* can be obtained through 802.11 exchanges (e.g., probing and/or association) with one or more of multimode WiFi AP 150, WiFi AP 160*a* and/or WiFi AP 160*b*. Based on one or more of the power management triggers, WLC 162 can generate updated UE presence information to communicate to MAE 180. In one embodiment, the UE presence information can be communicated to MAE 180 from WLC 162 via MSE 182. In another embodiment, the UE presence information can be communicated to MAE from WLC 162 directly.

MAE 180 can actively monitor the group area defined by the combined WiFi coverage areas of multimode WiFi AP 150, WiFi AP 160*a* and WiFi AP 160*b* for updated UE presence information and will evaluate the UE presence information in comparison to various trigger criteria to control the power saving mode configured for small cell AP module 140. In one embodiment, trigger criteria can include disabling the power saving mode configured for small cell AP module 140 if one or more UE are present within the group area defined by the combined WiFi coverage areas of multimode WiFi AP 150, WiFi AP 160*a* and WiFi AP 160*b*. In another embodiment, trigger criteria can include enabling the power saving mode configured for small cell AP module 140 if one or more UE are not present within the group area defined by the combined WiFi coverage areas of multimode WiFi AP 150, WiFi AP 160*a* and WiFi AP 160*b*.

If the power saving mode for small cell AP module 140 is configured according to the first alternative (e.g., enable/disable power to the small cell AP module), MAE 180 via power management module 170*b* can control the power saving mode of small cell AP module 140 through at least one or both of MSE 182 including power management module 170*c* and/or WLAN controller 162 including power management module 170*d*.

In one embodiment, for example, MAE 180 via power management module 170*b* can signal MSE 182/power management module 170*c* to control the power saving mode of small cell AP module 140 based on one or more power management triggers. MSE 182/power management module 170 can relay the signaling to WLAN controller 162/power management module 170*d*, which can control the power saving mode of small cell AP module 140 through system controller 151 of the multimode WiFi AP 150. In one embodiment, system controller 151 can enable or disable power to the small cell AP module 140 via power controller 141 and small cell controller 142. In another embodiment, for example, MAE 180 via power management module 170*b* can directly signal WLAN controller 162/power management module 170*d* (e.g., bypassing MSE 182/power management module 170*c*) to control the power saving mode of small cell AP module 140 based on one or more power management triggers.

If the power saving mode for small cell AP module 140 is configured according to the second alternative (e.g., enable/disable power to at least one of the transmitter and the receiver of the small cell AP module), MAE 180 via power management module 170*b* can control the power saving mode of small cell AP module 140 through small cell management system 136 including power management module 170*a*. In one embodiment, for example, MAE 180 via power management module 170*b* can signal small cell management system 136/power management module 170*a* to control the power saving mode of small cell AP module 140 based on one or more power management triggers. In such an embodiment, small cell management system 136/power management module 170*a* can control the power saving mode of small cell AP module 140 through power controller 141 and small cell controller 142 to enable or disable power to at least one of the small cell transmitter 146 and the small cell receiver 147 of small cell AP module 140.

Thus, power management operations for small cell AP module 140 can be triggered based on detected UE or associated UE being within a vicinity of a given WiFi AP that is within the defined group area for the small cell AP module 140 of the multimode WiFi AP 150. The power management operations facilitated via communication system 100 can provide particular advantages for base WiFi APs capable of accepting one or more plugin modules (e.g., small cell radio AP), such as the Aironet Access Points, manufactured by Cisco Systems, Inc., which can enable multi-RAT capabilities including, but not limited to 3G and/or 4G small cell AP connectivity. By mapping coverage areas that are shared between WiFi APs and a small cell AP into a defined group area, WiFi APs within the group area can be monitored via a centralized analytics engine (e.g. MAE 180) to facilitate dynamic power management for the small cell AP module of a multimode WiFi AP. Thus, using a base WiFi AP, the system and method as discussed for various embodiments herein can provide for either completely powering off a small cell AP module plugged into the base WiFi AP or placing the small cell AP module in a standby mode by powering off the transmitter and/or receiver of the module.

Each of the elements of FIG. 1A may couple to one another through simple interfaces (as illustrated) or through any other suitable connection (wired or wireless), which provides a viable pathway for network communications. Additionally, any one or more of these elements may be combined or removed from the architecture based on particular configuration needs. Communications in a network environment are referred to herein as 'messages' or 'messaging', which may be inclusive of packets. A packet is a formatted unit of data and can contain both control information (e.g., source and destination address, etc.) and data, which is also known as payload. In some embodiments, control information can be included in headers and trailers for packets. Messages can be sent and received according to any suitable communication messaging protocols. Suitable communication messaging protocols can include a multi-layered scheme such as the Open Systems Interconnection (OSI) Model, or any derivations or variants thereof.

In various embodiments, communication system 100 may implement user datagram protocol/Internet Protocol (UDP/IP) connections and/or transmission control protocol/IP (TCP/IP) communication language protocol in particular embodiments of the present disclosure. However, communication system 100 can alternatively implement any other suitable communication protocol, interface and/or standard, proprietary and/or non-proprietary, for transmitting and receiving messages. Other protocols, interfaces and/or communication standards that can be used in communication system 100 can include 3GPP DIAMETER-based protocols, RADIUS protocols, a service gateway interface (SGi), a terminal access controller access-control system (TA-CACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP), Generic Route Encapsulation (GRE), etc.

The terms 'data' and 'information' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

In various embodiments, service network 114 can represent a series of points or nodes of interconnected communication paths (wired or wireless) for receiving and transmitting packets of information that propagate through communication system 100 via multimode WiFi AP 150 and/or wireless APs 160a-160b. In various embodiments, service network 114 can be associated with and/or provided by a single network operator or service provider and/or multiple network operators or service providers. In various embodiments, service network 114 can include and/or overlap with, in whole or in part, one or more packet data networks, such as, for example, the Internet. Service network 114 may offer communicative interfaces between various elements of communication system 100 and may be any local area network (LAN), wireless local area network (WLAN), metropolitan area network (MAN), wide area network (WAN), virtual private network (VPN), Radio Access Network (RAN), enterprise network, Intranet, extranet, or any other appropriate architecture or system that facilitates communications in a network environment. In various embodiments, service network 114 may implement user datagram UDP/IP connections and/or TCP/IP communication language protocol in particular embodiments of the present disclosure. However, service network 114 may alternatively implement any other suitable communication protocol, interface and/or standard for transmitting and receiving data packets within communication system 100. In various embodiments, service network 114 can be multiple networks interconnected via one or more network appliances, elements, gateways, etc.

Mobile core network 116 may include other network appliances, elements, gateways, etc. that may make up an Evolved Packet Core (EPC) for 4G services, 2G and 3G architectures for General Packet Radio Service (GPRS), Circuit Switched (CS) services and Packet Switched (PS) services as provided in 3GPP specifications, including, for example, Technical Specification (TS) 23.401, etc. In various embodiments, mobile core network 116 may include elements, gateways, etc. to provide various UE services and/or functions, such as, for example, to implement Quality-of-Service (QoS) on packet flows, to provide connectivity for UE 110a-110b to external data packet networks (PDNs), to provision CS voice routing, to provide enhanced services such as enhanced charging, stateful firewalls and/or traffic performance optimization (TPO), etc.

In various embodiments, UE 110a-110b can be associated with any users, subscribers, employees, clients, customers, etc. wishing to initiate a flow in communication system 100 via some network. In at least one embodiment, UE 110a-110b are configured to facilitate simultaneous WiFi connectivity and cellular connectivity within communication system 100. The terms 'user equipment', 'mobile node', 'mobile station' or 'mobile device' are inclusive of devices used to initiate a communication, such as a computer, a personal digital assistant (PDA), a laptop or electronic notebook, a cellular telephone, an i-Phone™, i-Pad™, a Google Droid™ phone, an IP phone, or any other device, component, element, or object capable of initiating voice, audio, video, media, or data exchanges within communication system 100. UE 110a-110b may also be inclusive of a suitable interface to a human user such as a microphone, a display, a keyboard, or other terminal equipment.

UE 110a-110b may also be any device that seeks to initiate a communication on behalf of another entity or element such as a program, a database, or any other component, device, element, or object capable of initiating an exchange within communication system 100. In certain embodiments, UE 110a-110b may have a bundled subscription for network access and application services (e.g., voice), etc. Once the access session is established, the user can register for application services as well, without additional authentication requirements. Within communication system 100, IP addresses (e.g., for UE or any other element in communication system 100) can be assigned using dynamic host configuration protocol (DHCP), Stateless Address Auto-configuration (SLAAC), during default bearer activation processes, etc., or any suitable variation thereof. IP addresses used within communication system 100 can include IP version 4 (IPv4) and/or IP version 6 (IPv6) IP addresses.

Turning to FIG. 2, FIG. 2 is a simplified flow diagram illustrating example operations 200 associated with providing power management for a multimode WiFi AP in a network environment based on user presence in accordance with one potential embodiment of communication system 100. In various embodiments, operations 200 can be performed using any combination of hardware processors of multimode WiFi AP 150, WiFi APs 160a-160b, small cell AP module 140, MAE 180, MSE 182, WLAN controller 162 and/or small cell management system 136.

In one embodiment, the operations can begin at 202 in which it is determined whether at least one UE (e.g., UE 110a and/or UE 110b) is present within a combined WiFi coverage area that overlaps a small cell coverage area of a multimode AP (e.g., multimode WiFi AP 150) that includes a WiFi AP portion and a small cell AP portion (e.g., small cell AP module 140). As discussed for various embodiments herein, UE presence can be determined for detected UE(s) and/or associated UE(s) via one or more WiFi APs having coverage areas that overlap the small cell coverage area of the multimode AP.

At 204, the operations can include controlling a power saving mode of the small cell AP portion of the multimode AP based on whether at least one UE is determined to be present within the combined WiFi coverage area that overlaps the small cell coverage area of the multimode AP. The operations can return to 202 to continue to determine UE presence within the combined WiFi coverage area that overlaps the small cell coverage area of the multimode AP.

As discussed for various embodiments described herein, controlling a power saving mode of a small cell AP portion of a multimode AP can include enabling or disabling power to the small cell AP portion completely or enabling or disabling power for at least one of a transmitter and a receiver of the small cell AP portion. Accordingly, the system and method provided by communication system 100 can provide an efficient energy saving mechanism for a multimode AP where one or more WiFi APs are used to detect user presence in order control a power saving mode for a small cell AP module for the multimode AP.

Various signaling operations that can be provided via communication system 100 to provide power management for a multimode WiFi AP depending on the power saving mode configured for a small cell AP portion of multimode WiFi AP can be best illustrated via interaction diagrams, which are provided herein with regard to FIGS. 3A-3D and 4A-4D.

Turning to FIGS. 3A-3D, FIGS. 3A-3D is a simplified interaction diagram 300 illustrating example details that can be associated with providing power management for multimode WiFi AP 150 in accordance with various potential embodiments of communication system 100. In particular, FIGS. 3A-3D can be associated for an embodiment in which the power saving mode for small cell AP module 140 is configured according to the first alternative in which power management for the multimode WiFi AP 150 can be provided by enabling or disabling power to the small cell AP module 140 based on UE presence within a group area defined by the small cell coverage area 132 and the WiFi coverage areas 166, 168a and 168b. FIGS. 3A-3D include a given UE (e.g., UE 110b) whose presence can be determined via a given WiFi AP (e.g., WiFi AP 160b). FIGS. 3A-3D also include WLAN controller (WLC) 162, small cell gateway 134, small cell management system 136, MSE 182 and MAE 180. For FIGS. 3A-3D, it is assumed that UE 110a is moved out of WiFi coverage area 166 of multimode WiFi AP 150.

Figure 3B:
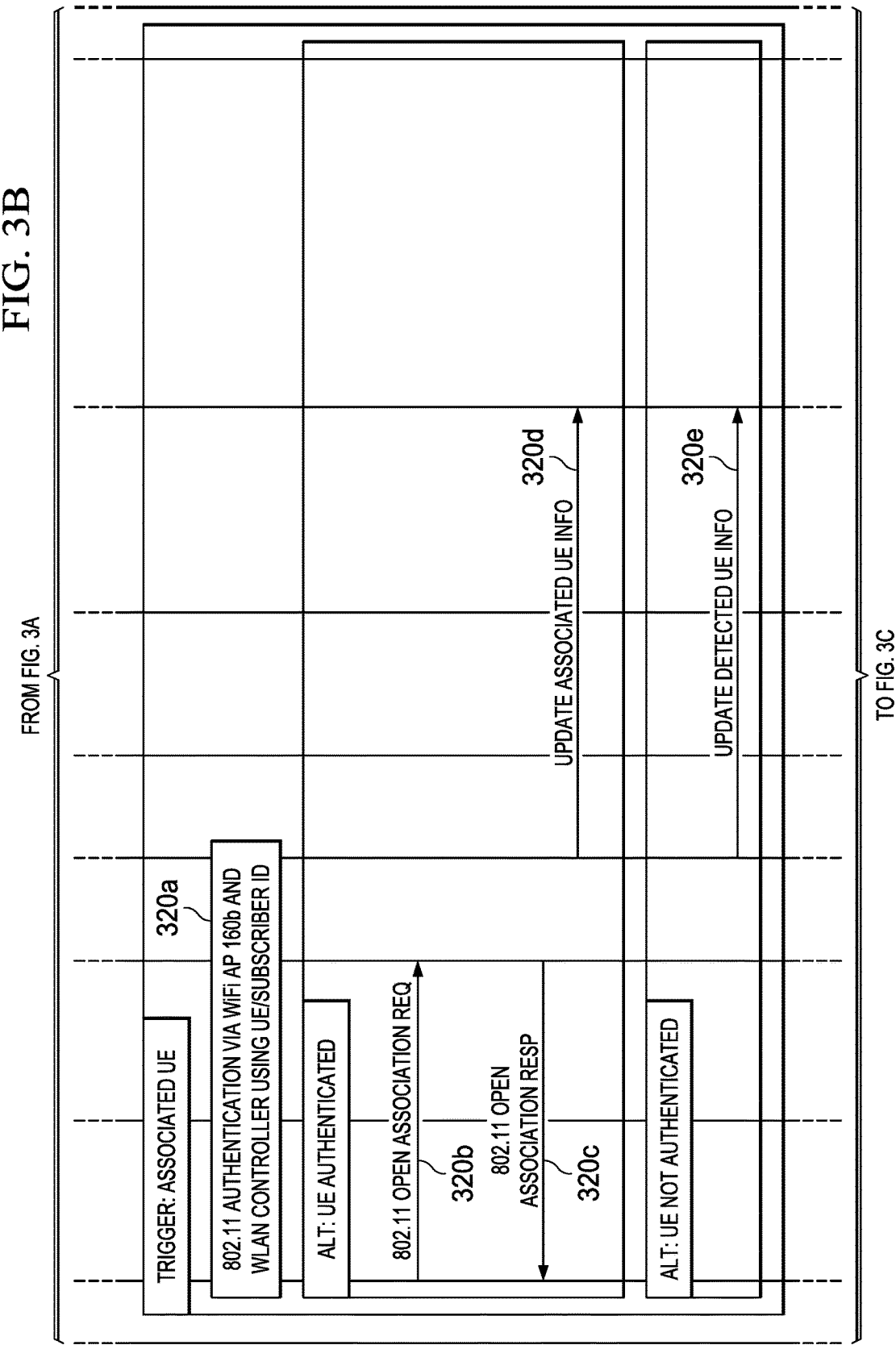
Figure 3D:
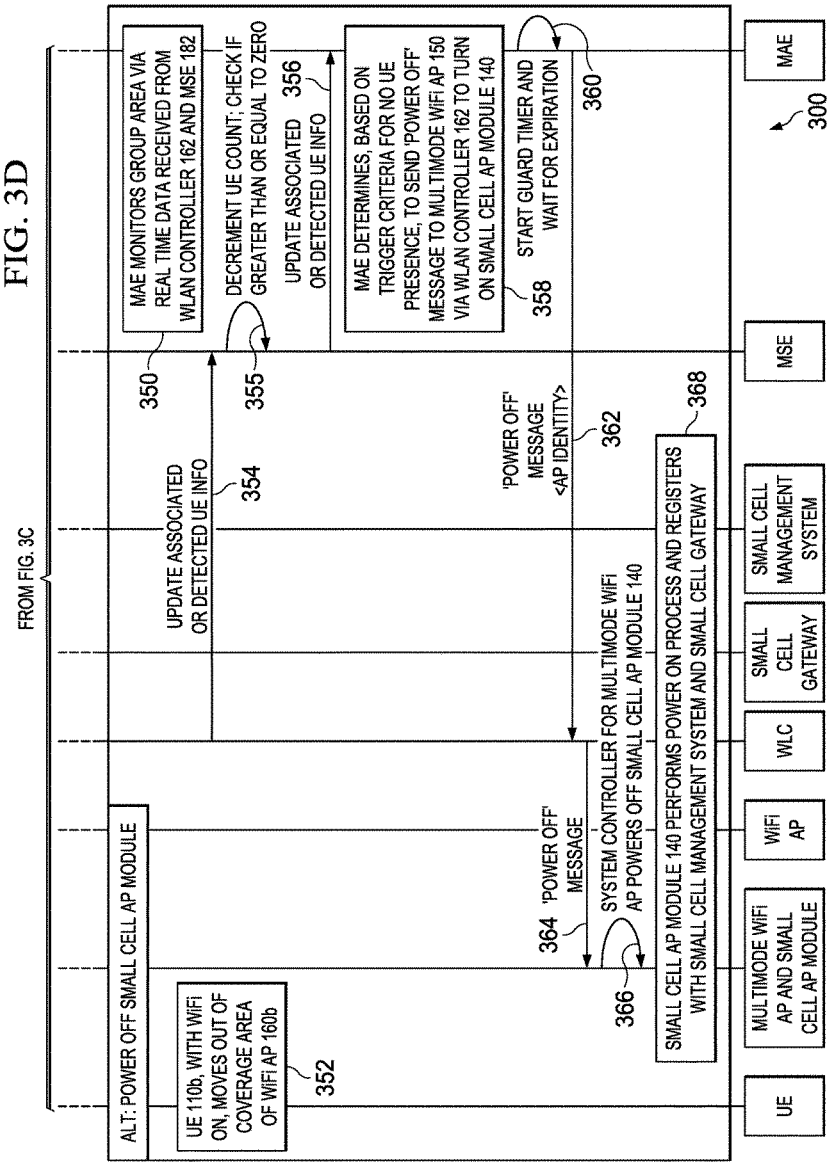

FIGS. 3A-3C illustrate an alternative embodiment in which power for small cell AP module 140 is assumed to be off and can be turned on based on a determination of UE presence within the group area including multimode WiFi AP 150, small cell AP module 140, WiFi AP 160a and WiFi AP 160b. FIG. 3D illustrates an alternative embodiment in which power for small cell AP module 140 is assumed to be on (e.g., following operations shown in FIGS. 3A-3C) and can be turned off based on a determination of no UE presence within the group area.

Beginning at 302, it is assumed that MSE 182 is configured with group area information for WiFi APs 160a, 160b and multimode WiFi AP 150 having a combined WiFi coverage area (168a, 168b and 162) that is shared with the small cell coverage area 132 for the small cell AP module 140 of the multimode WiFi AP 150. At 304, an exchange can be performed between MSE 182 and MAE 180 in order for MAE 180 to learn of the group area defined for small AP module 140, multimode WiFi AP 150, WiFi AP 160a and WiFi AP 160b. At 306, it is assumed that small cell AP module 140 is powered off due to UE 110b (or any other UE, for example, UE 110a) not being within the combined WiFi coverage area for the group area. At 308, it is assumed that UE 110b having WiFi capabilities turned on, moves into coverage area 168b of WiFi AP 160b.

Both power management triggers for detected UE and associated UE are shown for interaction diagram 300. Interactions 310a-310c illustrate signaling exchanges for an 802.11 probing procedure that can carried out between UE 110b and WiFi AP 160b according to certain embodiments. Interactions 320a-320d illustrate signaling exchanges for an 802.11 association procedure that can be carried out between UE 110b and WiFi AP 160b assuming UE 110b is authenticated with WiFi AP 160b according to certain embodiments.

For the 802.11 probing procedures, at 310a, WiFi AP 160b can transmit an 802.11 beacon, which can be received by UE 110b. At 310b, UE 110b can respond with an 802.11 probing request in which the UE advertises its supported data rates and 802.11 capabilities. Assuming WiFi AP 160b supports data rates compatible with UE 110b, WiFi AP responds at 310c with an 802.11 probing response including its compatible data rates, security parameters and capabilities.

In at least one embodiment, 802.11 association procedures shown at 320a-320c can proceed following the probing procedures to authenticate and associate UE 110b at WiFi AP 160b. At 320a, an 802.11 authentication procedure is performed for UE 110b/the subscriber associated with the UE via WiFi AP 160b and WLAN controller 162 using a UE/subscriber ID (e.g., IMSI). In one embodiment, the 802.11 authentication procedure can be performed via a whitelist server which can be configured for or in communication with WLAN controller 162. Assuming the authentication is successful, WLAN controller 162 802.11 an association procedure begins at 320b in which UE 110b sends WiFi AP 160b an 802.11 open association request including various security parameters and/or other 802.11 capabilities. Assuming the association request matches the capabilities of the WiFi AP 160b, the WiFi AP 160b responds with an 802.11 association response at 320c. At 320d, WLAN controller 162 updates associated UE information for MSE 182 indicating presence of the associated UE 110b within the coverage area 168b of WiFi AP 160b. However, if the UE is not successfully authenticated at 320a, WLC 162 updates detected UE information for MSE 182 indicating a presence of the detected UE 110b within the coverage area 168b of WiFi AP 160b at 320e. Thus as shown in FIGS. 3A-3B, both detected UE and associated UE can be used to trigger power management operations for small cell AP module 140 of multimode WiFi AP 150.

Continuing to FIG. 3C, in at least one embodiment, MSE 182 can maintain a list and/or a UE count for the number of UE present within the group area defined by multimode WiFi AP 150, WiFi AP 160a and WiFi AP 160b to track when a first UE enters the WiFi coverage of a member of the group area (e.g., UE count for group area >0) and when a last UE exits the WiFi coverage of a member of the group area (e.g., UE count for group area=0) such that MSE 182 can send MAE 180 updated detected or associated UE information only at times when control of the power saving mode of small cell AP module 140 should be triggered; thereby minimizing signaling between MSE 182 and MAE 180 for every detected or associated UE whose presence or lack thereof may be determined for the group area. In some embodiments, the list and/or UE count could be maintained by WLC 162 if the WLC is configured with group area information.

At initialization, for example at 302, the UE count for MSE 182 can be set to zero (0). At 329, MSE 182 can increment the UE count based on the presence of detected or associated UE 110b and can check whether the UE count is greater than zero. Because the UE count will be greater than zero, MSE 182 can communicate the updated associated or detected UE information for WiFi AP 160b to MAE 180 at 330 indicating that a UE is present in the group area. At 332, MAE 180, which is monitoring the group area can analyze the updated associated or detected UE information (info) received from MSE 182 to determine that a UE has entered the combined WiFi coverage area for the group area. Based on trigger criteria configured for MAE 180/power management module 170a, which can indicate that for UE presence determined within the group area that small cell AP module 140 should be turned on (e.g., power saving mode disabled), MAE 180 via power management module 170a can determine to send a 'POWER ON' message to multimode WiFi AP 150, which includes small cell AP module 140 for the group area, through WLAN controller 162/power management module 170d to turn on small cell AP module 140.

At 334, MAE 180/power management module 170b sends a POWER ON message to WLAN controller 162/power management module 170d including an identity (e.g., <AP identity>) for multimode WiFi AP 150. At 336, WLAN controller 162/power management module 170d performs a lookup on the AP identity and determines to send the POWER ON message to multimode WiFi AP 150. At 338, the system controller 151 for multimode WiFi AP 150 controls the power saving mode for small cell AP module 140 via power controller 141 to disable the power saving mode; thereby powering on small cell AP module 140 via power controller 141. At 340, the small cell AP module 140 performs its power on process and registers with small cell management system 136 and small cell gateway 134 and begins broadcasting and receiving 3G and/or 4G service.

As noted above, FIG. 3D illustrates an alternative embodiment in which power for small cell AP module 140 is assumed to be on (e.g., following operations shown in FIGS. 3A-3C) and can be turned off based on a determination of no UE presence within the group area. At 350, MAE 180 monitors the group area via real time data received from WLAN controller 162 and MSE 182. At 352, it is assumed that UE moves out of the coverage area of WiFi AP 160b and is no longer associated to the WiFi AP. At 354, WLAN controller 162 sends a message to MSE 182 regarding updated associated or detected UE information for UE 110b, which indicates that UE 110b is no longer present within the coverage area of WiFi AP 160b. At 355, MSE 182 decrements the UE count for the group area and checks if the UE count is greater than or equal to zero. Because the UE count will be equal to zero following the decrement, MSE 182 can communicate the updated associated or detected UE information for the group area to MAE 180 at 356 indicating that no UE is present in the group area.

At 358, MAE 180 via power management module 170b analyzes the updated associated or detected UE information received from MSE 182 to determine that no UE is present within the combined WiFi coverage area for the group area. Based on trigger criteria configured for MAE 180/power management module 170a, which can indicate that for no UE presence within the group area that small cell AP module 140 should be powered off (e.g., power saving mode should be enabled), MAE 180 via power management module 170a can determine to send a 'POWER OFF' message to multimode WiFi AP 150, which includes small cell AP module 140 for the group area, through WLAN controller 162/power management module 170d to turn off small cell AP module 140.

However, prior to sending the 'POWER OFF' message, MAE 180 via power management module 170b can first start a guard timer at 360. The guard timer can help to buffer frequent changes to the power saving mode of small cell AP module 140 in cases where, for example, a UE moves out of the coverage area of a given WiFi AP for only a short period of time or moves between WiFi APs within a defined group area. In various embodiments, the period of time for the guard timer can be set between approximately 5 minutes and approximately 30 minutes; however, it should be understood that a network operator can set the guard timer to any value based on KPIs, etc. for a given deployment. Upon expiration of the guard timer, at 362, MAE 180/power management module 170b sends a 'POWER OFF' message to WLAN controller 162/power management module 170d including an identity (e.g., <AP identity>) for multimode WiFi AP 150. At 364, WLAN controller 162/power management module 170d performs a lookup on the AP identity and determines to send the POWER OFF message to multimode WiFi AP 150. At 366, the system controller 151 for multimode WiFi AP 150 controls the power saving mode for small cell AP module 140 to enable the power saving mode; thereby powering off small cell AP module 140 via power controller 141. At 368, the small cell AP module 140 is powered off and stops its service. Thus, as shown in the embodiment of FIGS. 3A-3D, control of the power saving mode of the small cell AP module 140 can be provided via multimode WiFi AP 150, WLC 162, MAE 180 and MSE 182 based on UE presence detected within the WiFi network including multimode WiFi AP 150, WiFi AP 160a and WiFi AP 160b.

Turning to FIGS. 4A-4D, FIGS. 4A-4D is a simplified interaction diagram 400 illustrating example details that can be associated with providing power management for multimode WiFi AP 150 in accordance with various potential embodiments of communication system 100. In particular, FIGS. 4A-4D can be associated for an embodiment in which the power saving mode for small cell AP module 140 is configured according to the second alternative in which power management for the multimode WiFi AP 150 can be provided by enabling or disabling power for at least one of small cell transmitter (Tx) 146 and/or the small cell receiver (Rx) 147 of the small cell AP module 140 based on UE presence within a group area defined by the small cell coverage area 132 and the WiFi coverage areas 166, 168a and 168b. FIGS. 4A-4D include a given UE (e.g., UE 110b) whose presence can be determined via a given WiFi AP (e.g., WiFi AP 160b). FIGS. 4A-4D also include WLAN controller (WLC) 162, small cell gateway 134, small cell management system 136, MSE 182 and MAE 180. For FIGS. 4A-4D, it is assumed that UE 110a is moved out of WiFi coverage area 166 of multimode WiFi AP 150.

Figure 4B:
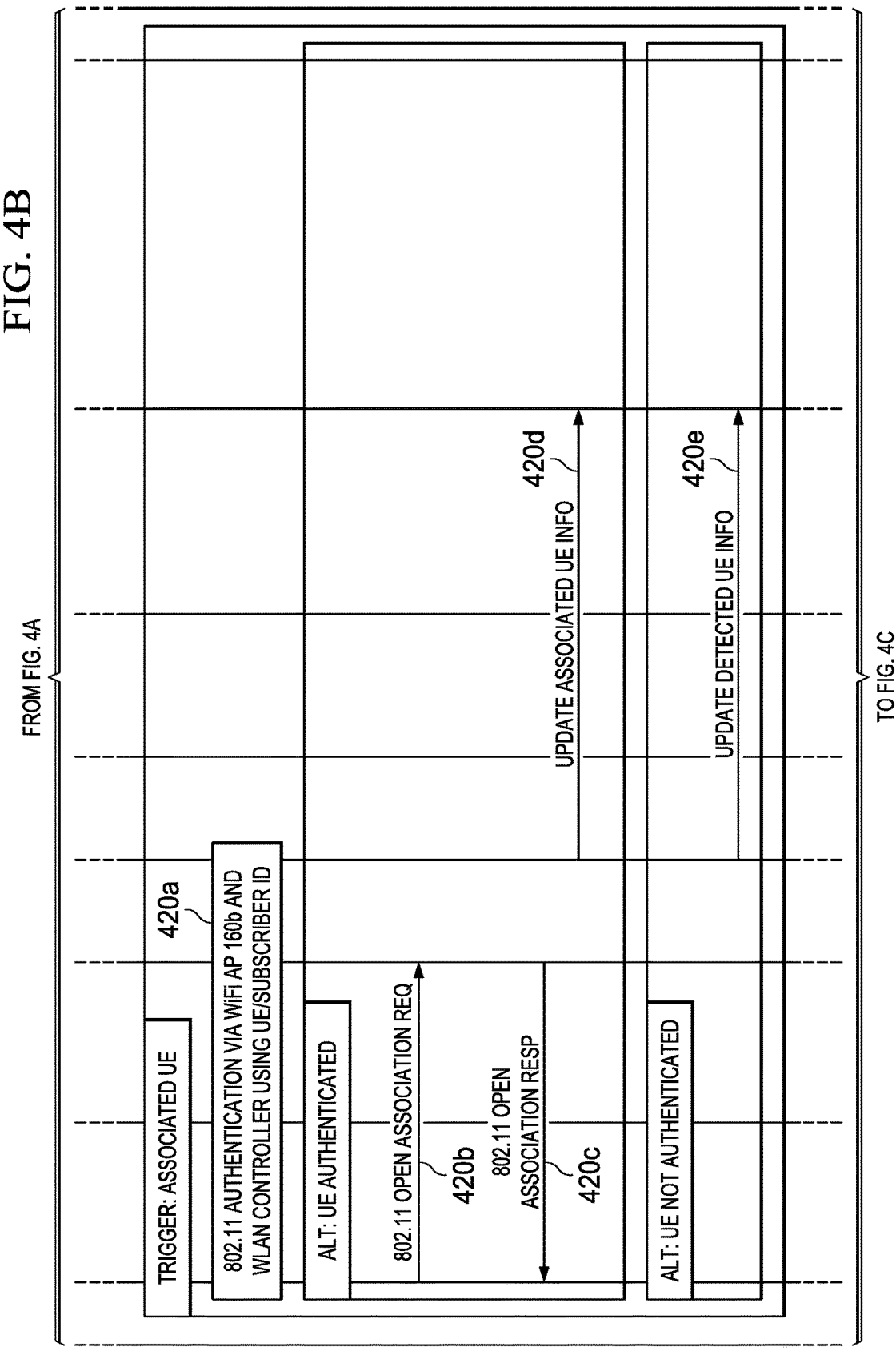

FIGS. 4A-4C illustrate an alternative embodiment in which power for at least one of the transmitter (Tx) and/or the receiver (Rx) of small cell AP module 140 is assumed to be off and can be turned on based on a determination of UE presence within the group area including multimode WiFi AP 150, small cell AP module 140, WiFi AP 160a and WiFi AP 160b. FIG. 4D illustrates an alternative embodiment in which power for the transmitter (Tx) and the receiver (Rx) of the small cell AP module 140 is assumed to be on (e.g., following operations shown in FIGS. 3A-3B) and can be turned off based on a determination of no UE presence within the group area.

Beginning at 402, it is assumed that MSE 182 is configured with group area information for WiFi APs 160a, 160b and multimode WiFi AP 150 having a combined WiFi coverage area (168a, 168b and 162) that is shared with the small cell coverage area 132 for the small cell AP module 140 of the multimode WiFi AP 150. At 404, an exchange can be performed between MSE 182 and MAE 180 in order for MAE 180 to learn of the group area defined for small AP module 140, multimode WiFi AP 150, WiFi AP 160a and WiFi AP 160b. At 406, it is assumed that at least one of the transmitter (Tx) and/or the receiver (Rx) of small cell AP module 140 is powered off due to UE 110b (or any other UE, for example, UE 110a) not being within the combined WiFi coverage area for the group area. At 408, it is assumed that UE 110b having WiFi capabilities turned on, moves into coverage area 168b of WiFi AP 160b.

Both power management triggers for detected UE and associated UE are shown for interaction diagram 400. Interactions 410a-410c illustrate signaling exchanges for an 802.11 probing procedure that can carried out between UE 110*b* and WiFi AP 160*b* according to certain embodiments. Interactions 410*a*-410*c* for the probing procedure can be carried out similar to interactions 310*a*-310*c* for FIG. 3A. Interactions 420*a*-420*d* illustrate signaling exchanges for an 802.11 association procedure that can be carried out between UE 110*b* and WiFi AP 160*b* assuming UE 110*b* is successfully authenticated with WiFi AP 160*b* according to certain embodiments. Interactions 420*a*-420*d* for the association procedure can be carried out similar to interactions 320*a*-320*d* for FIG. 3B. However, if the UE 110*b* is not successfully authenticated, WLC 162 updates detected UE information for MSE 182 indicating a presence of the detected UE 110*b* within the coverage area 168*b* of WiFi AP 160*b* at 420*e*. Thus as shown in FIGS. 4A-4B, both detected UE and associated UE can be used to trigger power management operations for small cell AP module 140 of multimode WiFi AP 150.

Continuing to FIG. 4C, in at least one embodiment, as discussed herein, MSE 182 can maintain a list and/or UE count of UE present within the group area defined by multimode WiFi AP 150, WiFi AP 160*a* and WiFi AP 160*b* to track when a first UE enters the WiFi coverage of a member of the group area (e.g., UE count for group area >0) and when a last UE exits the WiFi coverage of a member of the group area (e.g., UE count for group area=0) such that MSE 182 can send MAE 180 updated detected or associated UE information only at times when control of the power saving mode of small cell AP module 140 should be triggered.

Thus, at 429, MSE 182 can increment the UE count based on the presence of detected or associated UE 110*b* and can check whether the UE count is greater than zero. Because the UE count will be greater than zero, MSE 182 can communicate the updated associated or detected UE information for WiFi AP 160*b* to MAE 180 at 430. At 432, MAE 180, which is monitoring the group area can analyze the updated associated or detected UE information (info) received from MSE 182 to determine that a UE has entered the combined WiFi coverage area for the group area. Based on trigger criteria configured for MAE 180/power management module 170*a*, which can indicate that for UE presence determined within the group area that the transmitter and the receiver of small cell AP module 140 should be turned on (e.g., power saving mode disabled), MAE 180 via power management module 170*a* can determine to send a 'Tx/Rx POWER ON' message to small cell AP module 140 for the group area, through small cell management system 136 including power management module 170*a* to turn on the transmitter and the receiver of small cell AP module 140.

At 434, MAE 180/power management module 170*b* sends a Tx/Rx POWER ON message to small cell management system 136/power management module 170*a* including an identity (e.g., <small cell identity>) for the small cell AP module 140 of multimode WiFi AP 150. At 436, small cell management system 136 performs a lookup on the small cell identity and determines to send the Tx/Rx POWER ON message to small cell AP module 140 of multimode WiFi AP 150 using the TR-069 protocol. At 438, the small cell AP module 140 via small cell controller 142 and power controller 141 turn on the small cell transmitter 146 and receiver 147 to start broadcasting and receiving 3G and/or 4G service.

As noted above, FIG. 4D illustrates an alternative embodiment in which the transmitter and receiver for small cell AP module 140 are assumed to be on (e.g., following operations shown in FIGS. 4A-4C) and can be turned off based on a determination of no UE presence within the group area. At 450, MAE monitor the group area via real time data received from WLAN controller 162 and MSE 182. At 452, it is assumed that UE moves out of the coverage area of WiFi AP 160*b* and is no longer associated to the WiFi AP. At 454, WLAN controller 162 sends a message to MSE 182 regarding updated associated or detected UE information for UE 110*b*, which indicates that UE 110*b* is no longer present within the coverage area of WiFi AP 160*b*. At 455, MSE 182 decrements the UE count for the group area and checks if the UE count is greater than or equal to zero. Because the UE count will be equal to zero following the decrement, MSE 182 can communicate the updated associated or detected UE information for the group area to MAE 180 at 356 indicating that no UE is present in the group area at 456.

At 458, MAE 180 via power management module 170*b* analyzes the updated associated or detected UE information received from MSE 182 to determine that no UE is present within the combined WiFi coverage area for the group area. Based on trigger criteria configured for MAE 180/power management module 170*a*, which can indicate that for no UE presence within the group area that at least one of the transmitter and/or the receiver of small cell AP module 140 should be powered off (e.g., power saving mode should be enabled), MAE 180 via power management module 170*a* can determine to send a 'Tx/Rx POWER OFF' message to small cell AP module 140 for the group area, through small cell management system 136/power management module 170*a* to turn off at least one of the transmitter and/or the receiver of small cell AP module 140.

However, prior to sending the 'Tx/Rx POWER OFF' message, MAE 180 via power management module 170*b* can first start a guard timer at 460. Upon expiration of the guard timer, at 462, MAE 180/power management module 170*b* sends a Tx/Rx POWER OFF message to small cell management system 136/power management module 170*a* including an identity (e.g., <small cell identity>) for small cell AP module 140. At 464, small cell management system 136 performs a lookup on the small cell identity and determines to send the Tx/Rx POWER ON message to small cell AP module 140 of multimode WiFi AP 150 using the TR-069 protocol. At 466, the small cell AP module 140 via small cell controller 142 and power controller 141 turn off at least one of the small cell transmitter 146 and/or receiver 147 to stop broadcasting and/or receiving 3G and/or 4G service. Thus, as shown in the embodiment of FIGS. 4A-4D, control of the power saving mode of the small cell AP module 140 can also be provided via small cell management system 136 and MAE 180 based on UE presence detected within the WiFi network including multimode WiFi AP 150, WiFi AP 160*a* and WiFi AP 160*b*.

In regards to the internal structure associated with communication system 100, additionally each of UE 110*a*-110*b*, WiFi AP 160*a*, WiFi AP 160*b*, small cell management system 136, small cell gateway 134, WLAN controller 162, WLAN access gateway 164, MAE 180 and MSE 182 may each also include a respective processor, a respective memory element and/or a respective storage. Hence, appropriate software, hardware and/or algorithms are being provisioned in UE 110*a*-110*b*, small cell AP module 140, multimode WiFi AP 150, WiFi AP 160*a*, WiFi AP 160*b*, small cell management system 136, small cell gateway 134, WLAN controller 162, WLAN access gateway 164, MAE 180 and/or MSE 182 in order to facilitate various power management operations as described for various embodiments discussed herein to control a power saving mode configured for small cell AP module 140. Note that in certain examples, certain databases or storage (e.g., for storing information associated with power management operations) can be consolidated with memory elements (or vice versa), or the storage can overlap/exist in any other suitable manner.

In one example implementation, UE 110a-110b, small cell AP module 140, multimode WiFi AP 150, WiFi AP 160a, WiFi AP 160b, small cell management system 136, small cell gateway 134, WLAN controller 162, WLAN access gateway 164, MAE 180 and/or MSE 182 are network elements, which are meant to encompass network appliances, servers, routers, switches, gateways, bridges, load-balancers, firewalls, processors, modules, or any other suitable device, component, element, or object operable to exchange information that facilitates or otherwise helps to facilitate various power management operations as described for various embodiments discussed herein in a network environment (e.g., for networks such as those illustrated in FIG. 1A). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these elements may include any suitable algorithms, hardware, software, components, modules, interfaces, or objects that facilitate the operations thereof. This may be inclusive of appropriate algorithms, communication protocols, interfaces and/or standards, proprietary and/or non-proprietary that allow for the effective exchange of data or information.

In various embodiments, UE 110a-110b, small cell AP module 140, multimode WiFi AP 150, WiFi AP 160a, WiFi AP 160b, small cell management system 136, small cell gateway 134, WLAN controller 162, WLAN access gateway 164, MAE 180 and/or MSE 182 may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. Information being tracked or sent to UE 110a-110b, small cell AP module 140, multimode WiFi AP 150, WiFi AP 160a, WiFi AP 160b, small cell management system 136, small cell gateway 134, WLAN controller 162, WLAN access gateway 164, MAE 180 and MSE 182 could be provided in any database, register, control list, cache, or storage structure: all of which can be referenced at any suitable timeframe. Any such storage options may be included within the broad term 'memory element' as used herein. Similarly, any of the potential processing elements, modules, controllers, and machines described herein should be construed as being encompassed within the broad term 'processor'. Each of the network elements and/or user equipment can also include suitable interfaces for receiving, transmitting, and/or otherwise communicating data or information in a network environment.

Note that in certain example implementations, the power management operations as outlined herein may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIG. 1B] can store data used for the operations described herein. This includes the memory elements being able to store software, logic, code, or processor instructions that are executed to carry out the activities described herein. A processor (e.g., a hardware processor) can execute any type of instructions associated with data to achieve the operations detailed herein. In one example, the processors [as shown in FIG. 1B] could transform an element or an article (e.g., data, information) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable PROM (EEPROM) or an ASIC that includes digital logic, software, code, electronic instructions, or any suitable combination thereof.

Note that in this Specification, references to various features (e.g., elements, structures, modules, components, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, controller, function or the like as used herein this Specification, can be inclusive of an executable file comprising instructions that can be understood and processed on a computer, processor, combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of' or 'one or more of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    determining whether at least one user equipment (UE) is present within a combined WiFi coverage area that overlaps a small cell coverage area of a multimode access point (AP), wherein the multimode AP comprises both a WiFi AP portion comprising a WiFi transmitter and a WiFi receiver and a small cell AP portion comprising a small cell transmitter and a small cell receiver that enables the multimode AP to perform both WiFi communications and 3rd generation Partnership Project (3GPP) communications with at least one UE; and
    controlling a power saving mode for the small cell AP portion of the multimode AP based on whether at least one UE is determined to be present within the combined WiFi coverage area that overlaps the small cell coverage area of the multimode AP.

2. The method of claim 1, further comprising:
    configuring a mapping associating the small cell coverage area to the combined WiFi coverage area, wherein the combined WiFi coverage area comprises a plurality of WiFi coverage areas for a plurality of WiFi APs that overlap the small cell coverage area, wherein a WiFi coverage area of the WiFi AP portion of the multimode AP is included in the mapping.

3. The method of claim 2, wherein the power saving mode is associated with enabling or disabling power for the small cell AP portion of the multimode AP.

4. The method of claim 3, wherein the controlling further comprises one of:
    disabling power for the small cell AP portion of the multimode AP via a Wireless Local Area Network (LAN) Controller (WLAN) based on a determination that at least one UE is not present within the combined WiFi coverage area; and
    enabling power for the small cell AP portion of the multimode AP via a Wireless Local Area Network (LAN) Controller (WLAN) based on a determination that at least one UE is present within the combined WiFi coverage area.

5. The method of claim 2, wherein the power saving mode is associated with enabling or disabling power for at least one of the small cell transmitter and the small cell receiver of the small cell AP portion of the multimode AP.

6. The method of claim 5, wherein the controlling further comprises one of:
    disabling power for the at least one of the small cell transmitter and the small cell receiver of the small cell AP portion of the multimode AP via a small cell management system based on a determination that at least one UE is not present within the combined WiFi coverage area; and
    enabling power for the at least one of the small cell transmitter and the small cell receiver of the small cell AP portion of the multimode AP via a small cell management system based on a determination that at least one UE is present within the combined WiFi coverage area.

7. The method of claim 1, wherein a particular UE is determined to be present within the combined WiFi coverage area based on the particular UE completing an 802.11 association procedure with at least one of the: WiFi AP portion of the multimode AP and a one of a plurality of WiFi APs within the combined WiFi coverage area.

8. The method of claim 1, wherein a particular UE is determined to be present within the combined WiFi coverage area based on the particular UE completing an 802.11 probing procedure with at least one of the: WiFi AP portion of the multimode AP and a one of a plurality of WiFi APs within the combined WiFi coverage area.

9. One or more non-transitory tangible media encoding logic that include instructions for execution by a processor, wherein the execution causes the processor to perform operations comprising:
    determining whether at least one user equipment (UE) is present within a combined WiFi coverage area that overlaps a small cell coverage area of a multimode access point (AP), wherein the multimode AP comprises both a WiFi AP portion comprising a WiFi transmitter and a WiFi receiver and a small cell AP portion comprising a small cell transmitter and a small cell receiver that enable the multimode AP to perform both WiFi communications and 3rd generation Partnership Project (3GPP) communications with at least one UE; and controlling a power saving mode for the small cell AP portion of the multimode AP based on whether at least one UE is determined to be present within the combined WiFi coverage area that overlaps the small cell coverage area of the multimode AP.

10. The media of claim 9, wherein the execution causes the processor to perform further operations comprising:

configuring a mapping associating the small cell coverage area to the combined WiFi coverage area, wherein the combined WiFi coverage area comprises a plurality of WiFi coverage areas for a plurality of WiFi APs that overlap the small cell coverage area, wherein a WiFi coverage area of the WiFi AP portion of the multimode AP is included in the mapping.

11. The media of claim 10, wherein the power saving mode is associated with enabling or disabling power for the small cell AP portion of the multimode AP.

12. The media of claim 11, wherein the controlling further comprises one of:

disabling power for the small cell AP portion of the multimode AP via a Wireless Local Area Network (LAN) Controller (WLAN) based on a determination that at least one UE is not determined to be present within the combined WiFi coverage area; and enabling power for the small cell AP portion of the multimode AP via a Wireless Local Area Network (LAN) Controller (WLAN) based on a determination that at least one UE is determined to be present within the combined WiFi coverage area.

13. The media of claim 10, wherein the power saving mode is associated with enabling or disabling power for at least one of the small cell transmitter and the small cell receiver of the small cell AP portion of the multimode AP.

14. The media of claim 13, wherein the controlling further comprises one of:

disabling power for the at least one of the small cell transmitter and the small cell receiver of the small cell AP portion of the multimode AP via a small cell management system based on a determination that at least one UE is not present within the combined WiFi coverage area; and enabling power for the at least one of the small cell transmitter and the small cell receiver of the small cell AP portion of the multimode AP via a small cell management system based on a determination that at least one UE is present within the combined WiFi coverage area.

15. The media of claim 9, wherein a particular UE is determined to be present within the combined WiFi coverage area based on the particular UE completing an 802.11 association procedure with at least one of the: WiFi AP portion of the multimode AP and a one of a plurality of WiFi APs within the combined WiFi coverage area.

16. The media of claim 9, wherein a particular UE is determined to be present within the combined WiFi coverage area based on the particular UE completing an 802.11 probing procedure with at least one of the: WiFi AP portion of the multimode AP and a one of a plurality of WiFi APs within the combined WiFi coverage area.

17. A communication system comprising:

at least one memory element for storing data; and at least processor that executes instructions associated with the data, wherein the executing causes the system to perform operations comprising:

determining whether at least one user equipment (UE) is present within a combined WiFi coverage area that overlaps a small cell coverage area of a multimode access point (AP), wherein the multimode AP comprises both a WiFi AP portion comprising a WiFi transmitter and a WiFi receiver and a small cell AP portion comprising a small cell transmitter and a small cell receiver that enable the multimode AP to perform both WiFi communications and 3rd generation Partnership Project (3GPP) communications with at least one UE; and controlling a power saving mode for the small cell AP portion of the multimode AP based on whether at least one UE is determined to be present within the combined WiFi coverage area that overlaps the small cell coverage area of the multimode AP.

18. The communication system of claim 17, wherein the power saving mode is associated with enabling or disabling power for the small cell AP portion of the multimode AP.

19. The communication system of claim 17, wherein the power saving mode is associated with enabling or disabling power for at least one of the small cell transmitter and the small cell receiver of the small cell AP portion of the multimode AP.

20. The communication system of claim 17, wherein a particular UE is determined to be present within the combined WiFi coverage area based on at least one of:

the particular UE completing an 802.11 association procedure with at least one of the: WiFi AP portion of the multimode AP and a one of a plurality of WiFi APs within the combined WiFi coverage area; and the particular UE completing an 802.11 probing procedure with at least one of the: WiFi AP portion of the multimode AP and a one of a plurality of WiFi APs within the combined WiFi coverage area.

* * * * *